United States Patent
Saito et al.

(10) Patent No.: US 7,016,530 B2
(45) Date of Patent: Mar. 21, 2006

(54) IMAGE PROCESSING METHOD, IMAGE PROCESSING APPARATUS, AND PROGRAMS THEREOF

(75) Inventors: Kazuhiro Saito, Kanagawa (JP); Makoto Torigoe, Tokyo (JP); Yoshiko Iida, Tokyo (JP); Tetsuya Suwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 801 days.

(21) Appl. No.: 09/902,719

(22) Filed: Jul. 12, 2001

(65) Prior Publication Data

US 2002/0021458 A1    Feb. 21, 2002

(30) Foreign Application Priority Data

Jul. 14, 2000 (JP) .............................. 2000-214386

(51) Int. Cl.
*G06K 9/00* (2006.01)

(52) U.S. Cl. ...................................... 382/162; 358/2.1
(58) Field of Classification Search ........ 382/162–167; 358/500–540, 1.3, 2.1
See application file for complete search history.

(56) References Cited

U.S. PATENT DOCUMENTS

| | | | | |
|---|---|---|---|---|
| 5,241,373 A | * | 8/1993 | Kanamori et al. | 348/645 |
| 5,581,376 A | * | 12/1996 | Harrington | 430/5 |
| 5,689,350 A | | 11/1997 | Rolleston | 358/504 |
| 5,982,990 A | * | 11/1999 | Gondek | 358/1.9 |
| 6,049,400 A | * | 4/2000 | Vondran, Jr. | 358/525 |
| 6,115,148 A | * | 9/2000 | Imai et al. | 358/500 |
| 6,269,184 B1 | * | 7/2001 | Spaulding et al. | 382/167 |
| 6,466,333 B1 | * | 10/2002 | Schoolcraft et al. | 358/1.9 |
| 6,771,275 B1 | * | 8/2004 | Cook et al. | 345/604 |
| 6,773,175 B1 | * | 8/2004 | Yamamoto | 400/61 |

FOREIGN PATENT DOCUMENTS

| | | |
|---|---|---|
| DE | 31 45 535 | 5/1983 |
| EP | 529 967 | 3/1993 |
| EP | 674 430 | 9/1995 |
| EP | 820 189 | 1/1998 |
| JP | 2000-115556 | 4/2000 |

\* cited by examiner

*Primary Examiner*—Jingge Wu
(74) *Attorney, Agent, or Firm*—Fitzpatrick, Cella, Harper & Scinto

(57) ABSTRACT

A color reproduction region of an image formation apparatus is to be effectively used and characteristic in lightness, hue and chroma is to be smoothed. In case of creating tables for separating color into color of coloring agent available in the image formation apparatus, a maximum line in the color reproduction region of the image formation apparatus is defined, internal lines in the color reproduction region of the image formation apparatus are defined and the tables are created by performing interpolation processing on the basis of the maximum line and the internal lines.

9 Claims, 21 Drawing Sheets

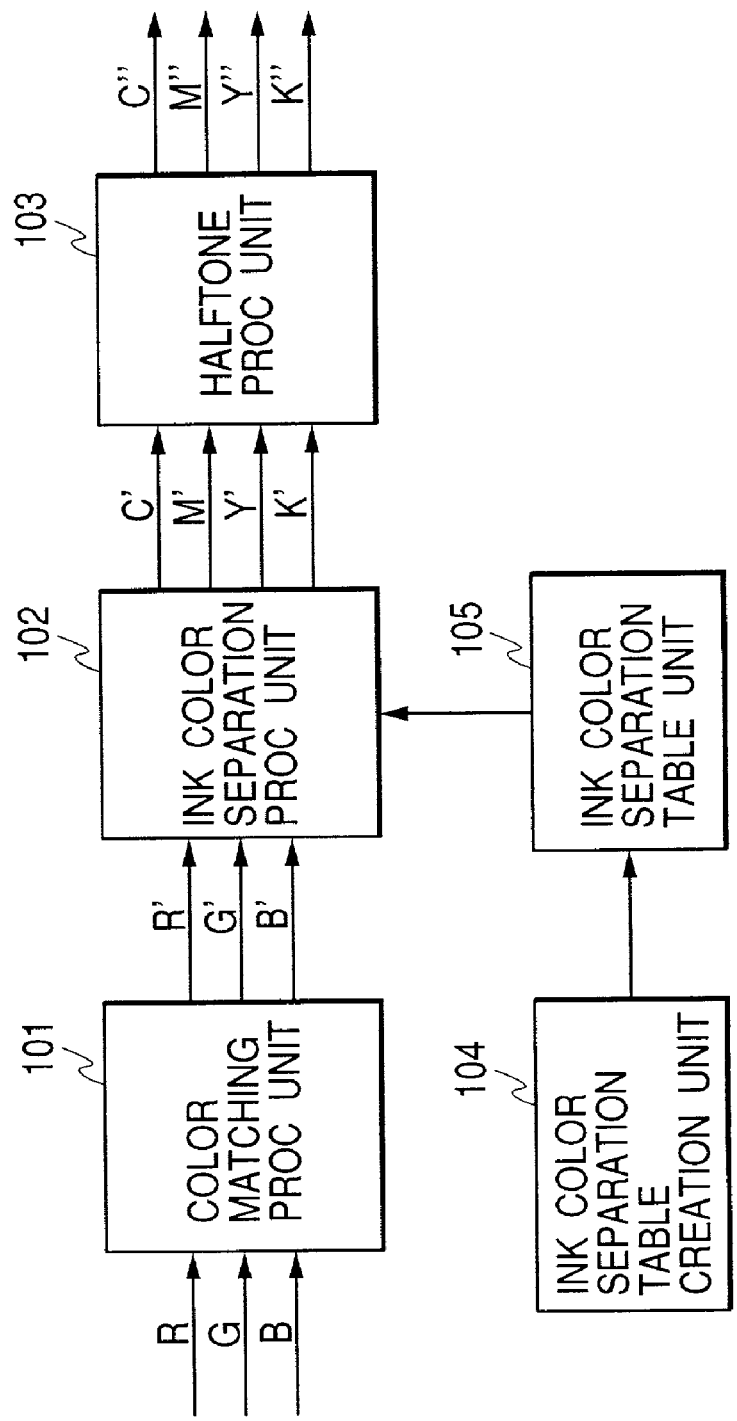

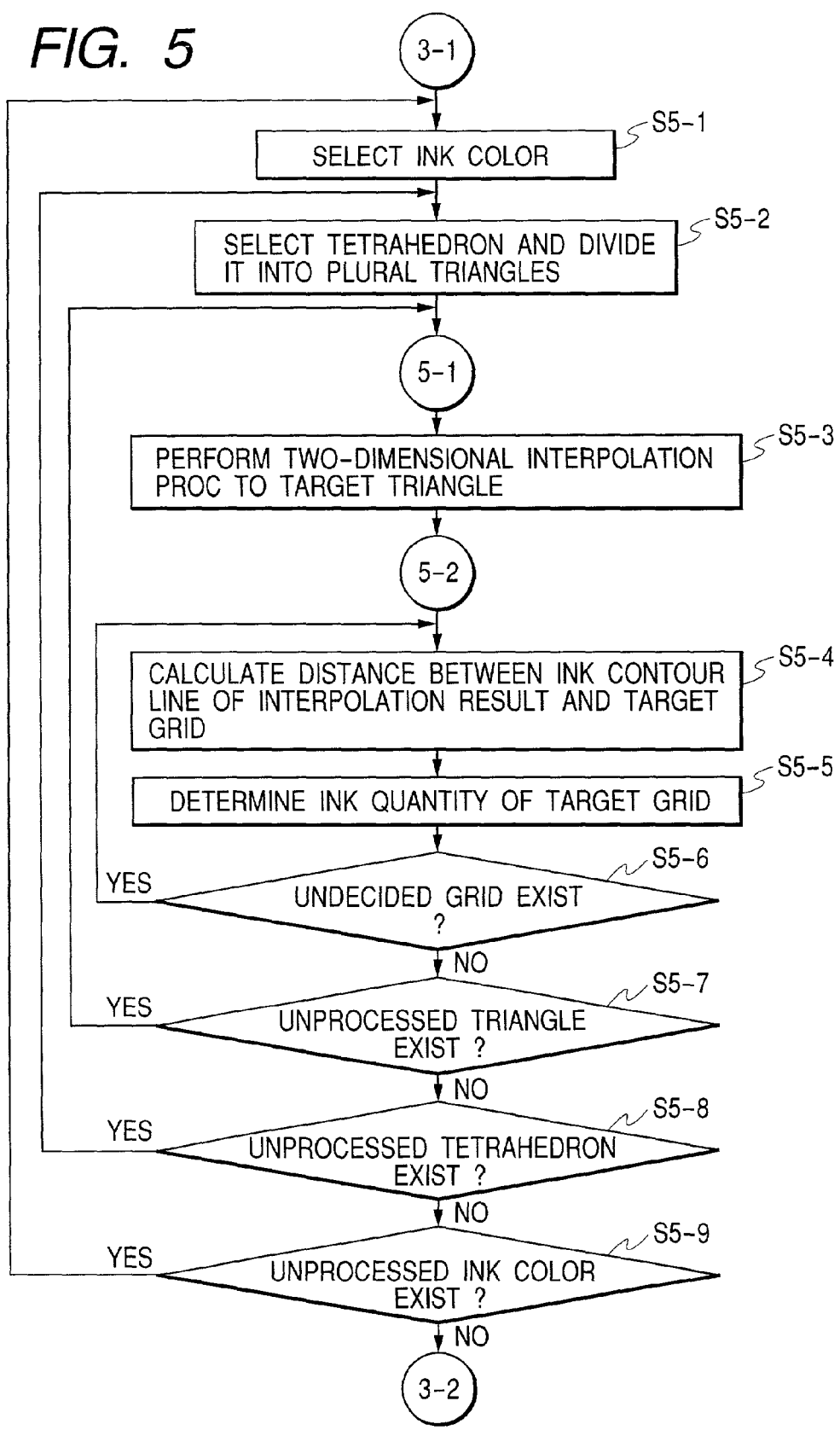

IMAGE PROCESSING METHOD, IMAGE PROCESSING APPARATUS, AND PROGRAMS THEREOF

BACKGROUND OF THE INVENTION

1. Field of the Invention

The present invention relates to creation of a table used for separating a given color into colors of the coloring agents available in a particular image formation apparatus.

2. Related Background Art

Conventionally, processing for separating a color into data corresponding to the coloring agents available in a color printer (hereinafter, called "ink color separation processing") is as shown in FIG. 22. Hereinafter, an explanation of the ink color separation processing will be given with reference to FIG. 22.

Numeral 2201 denotes a luminance/density conversion unit, numeral 2202 denotes a UCR/BG processing unit, numeral 2203 denotes a BG quantity setting unit and numeral 2204 denotes a UCR (under-color removal) quantity setting unit. In the luminance/density conversion unit 2201, luminance information of 8-bit data of R', G' and B' that are being input is converted into C, M and Y data based on the following expressions:

$$C = -\alpha \log(R'/255) \quad (1)$$

$$M = -\alpha \log(G'/255) \quad (2)$$

$$Y = -\alpha \log(B'/255) \quad (3)$$

where $\alpha$ denotes an arbitrary real number.

Next, the C, M and Y data are respectively converted by use of $\beta(\text{Min}(C, M, Y), \mu)$ set in a BG coefficient setting unit 1603 and a value $\mu\%$ set in a UCR coefficient setting unit 1604 as follows:

$$C' = C - (\mu/100) \times \text{Min}(C, M, Y) \quad (4)$$

$$M' = M - (\mu/100) \times \text{Min}(C, M, Y) \quad (5)$$

$$Y' = Y - (\mu/100) \times \text{Min}(C, M, Y) \quad (6)$$

$$K' = \beta(\text{Min}(C, M, Y), \mu) \times (\mu/100) \times \text{Min}(C, M, Y) \quad (7)$$

where the $\beta(\text{Min}(C, M, Y), \mu)$ denotes a real number which is varied by the Min(C, M, Y) and the value $\mu$. A dyeing method of K ink can be set according to a value of this real number.

Since the UCR quantity and the BG quantity have a great influence on a color reproduction region of the color printer and on the degree of graininess that appears in printing performed by the printer accompanied by the dyeing method of K ink, those quantities become important parameters for the color printer.

However, conventionally, since the UCR quantity is calculated by multiplying a UCR coefficient $\mu$ by the Min(C, M, Y), and the BG quantity is calculated by multiplying the BG coefficient $\beta$ by the UCR coefficient $\mu$ by the Min(C, M, Y), it was impossible to set optimized UCR and BG quantities for every hue, and as a result the following problems existed.

For a certain hue of a target printer, even though that color of higher chroma can be outputted, the ink color separation processing which would be needed to produce that color cannot be provided.

Again, even though the effect of graininess caused by the K ink can be reduced more based on appropriate combination of ink quantities, the corresponding ink color separation processing cannot be provided.

In the above conventional example, the non-linear characteristics that obtain in a case of the mixture of plural inks cannot be sufficiently compensated for or taken into account, and distorted characteristics remain in lightness, hue and chroma.

SUMMARY OF THE INVENTION

An object of the present invention is to solve the above problems.

An object of the first invention is to effectively use a color reproduction region of an image formation apparatus and avoid to have distorted characteristic in lightness, hue and chroma.

An object of the second invention is to reduce the influence of graininess caused by K ink.

The first invention relates to an image processing method, which creates a table for separating color into color of coloring agent available in an image formation apparatus, is characterized in that a maximum line in the color reproduction region of the image formation apparatus is defined, internal lines in the color reproduction region of the image formation apparatus are defined, and interpolation processing is executed on the basis of the maximum line and the internal lines, whereby the table is created.

The second invention relates to an image processing method, that creates a table of an image formation apparatus for performing an image formation using plural coloring agents having different densities for the same color. In this method, a first line from black to white is defined, and plural second lines from white to a primary color and a secondary color are defined. In addition, plural third lines from the primary color and the secondary color to black are defined, and the table is created according to the first line, the second lines and the third lines. According to this method, a start of dyeing coloring agent (i.e., the point at which a transition is made from using only a lower-density dye to a higher-density dye of the same hue) is controlled by a user independently with respect to each of the first line, the second lines and the third lines.

Other objects and features of the present invention will become apparent from the following detailed description and the attached drawings.

BRIEF DESCRIPTION OF THE DRAWINGS

FIG. 1 is a block diagram indicating the structure of a first embodiment;

FIG. 5 is a flow chart for explaining in detail internal interpolation processing executed in a step S3-4 shown in FIG. 3;

DETAILED DESCRIPTION OF THE PREFERRED EMBODIMENTS

FIRST EMBODIMENT

FIG. 1 is a view showing an outline of image processing according to the present embodiment.

Numeral 101 denotes a color matching processing unit for matching reproduction characteristics of R, G and B data with colors available in a printer.

Numeral 102 denotes an ink color separation processing unit for respectively converting R', G' and B' multi-level data from the color matching processing unit 101 into the colors of the coloring agents C' (cyan), M' (magenta), Y' (yellow) and K' (black) available in the printer. Numeral 103 denotes a halftone processing unit for respectively converting C', M', Y' and K' multi-level data from the ink color separation processing unit 102 into data of a gradation number which can be expressed by the printer. Numeral 105 denotes an ink color separation table unit for providing a table (LUT: look-up table) used in executing interpolation processing in the ink color separation processing unit 102. Numeral 104 denotes an ink color separation table creation unit for creating the LUT of the ink color separation table unit 105.

Figure 14:
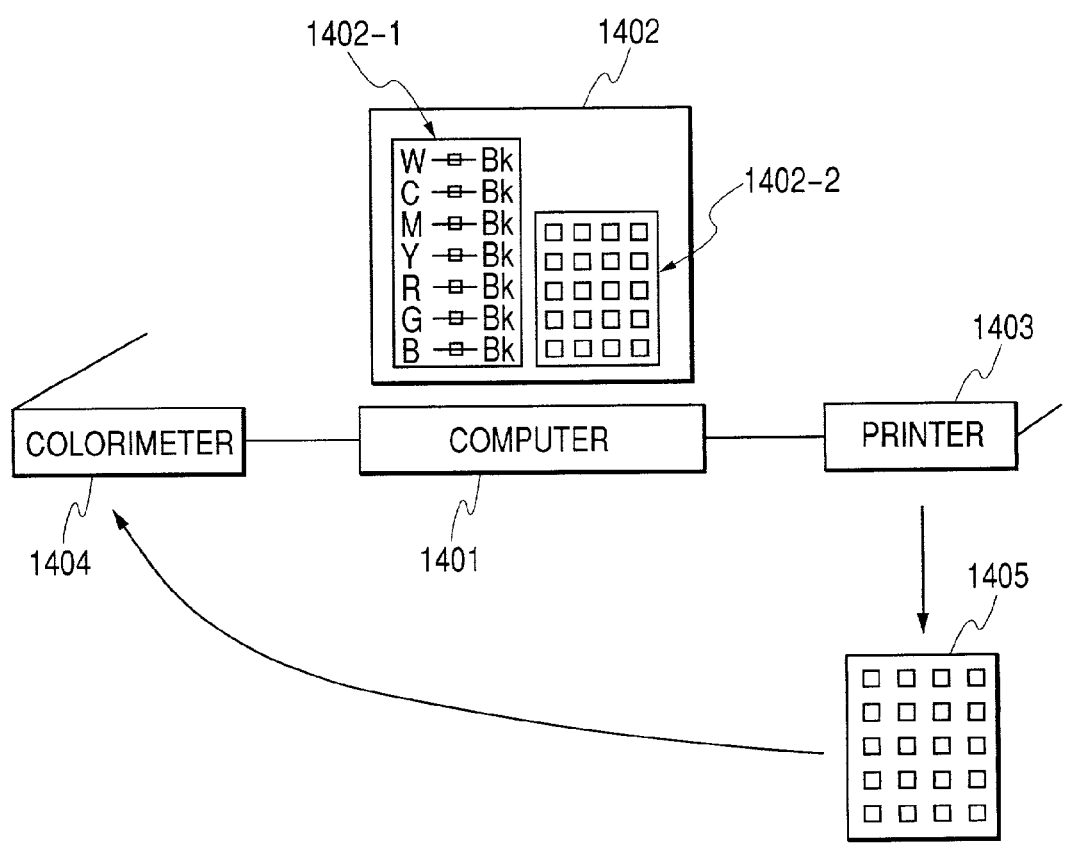
FIG. 14 is a view showing the structure of a system according to the present embodiment.

FIG. 14 is a view showing the structure of a system according to the present embodiment.

Numeral 1401 denotes a computer, in which patch data used for checking printer characteristic is held and software used for determining a parameter by a UI (user interface) or the like is installed. Numeral 1402 denotes a monitor which is connected to the computer 1401. Numeral 1402-1 denotes an ink dyeing UI used for determining an ink dyeing point. On a displaying portion 1402-2, patch patterns used for checking the printer characteristics are displayed. Numeral 1403 denotes a color printer for printing predetermined patch data. Numeral 1405 denotes a patch sample printed by the color printer 1403. Numeral 1404 denotes a colorimeter for measuring the patch sample 1405.

Patch data of C', M', Y' and K' held in the computer 1401 shown in FIG. 14 are respectively transmitted to the printer 1403 through a cable, a network (not shown) or the like in order for the patch data to be printed by the printer 1403. In the printer 1403, the data of C', M', Y' and K' are directly transmitted to the halftone processing unit 103 respectively while bypassing the color matching processing unit 101 and the ink color separation processing unit 102 shown in FIG. 1. In the halftone processing unit 103, only halftone processing is executed on the data of C', M', Y' and K' to perform the print. The printed patch sample 1405 is measured in the colorimeter 1404 shown in FIG. 14 to be taken into the computer 1401. The patch sample 1405 may be one by means of which the ink characteristics of the printer can be checked, such as gradation patterns of primary colors C, M, Y and K, secondary colors CM, MY, YC, CK, MK and YK, tertiary colors CMY, CMK, MYK and YCK, quartic colors CMYK, or the like, available in the printer. In an example shown in FIG. 14, as a printer characteristic input unit 106 shown in FIG. 1, the colorimeter 1404 is used, and as the ink color separation table creation unit 104, the computer 1401 is used. Therefore, actual processing in the ink color separation table creation unit 104 explained in detail with reference to FIG. 2 and the following drawings is executed using the computer 1401, and ink color separation tables are created. The ink color separation tables created in t his fashion are downloaded to the ink color separation table unit 105 in the printer 1403 through a cable or a network (not shown) in order to perform printing from the computer 1401.

Next, processing of color image data using downloaded data of the ink color separation tables will be explained. Color matching processing is executed on multi-level color image data of R, G and B in the color matching processing unit 101 shown in FIG. 1 so as to match the color reproduction characteristics of the monitor 1402 being used by a user. The matching-processed color image data of R', G' and B' are respectively separated into data of ink colors in the ink color separation processing unit 102 according to the interpolation processing on the basis of data of the previously created ink color separation table unit 105. The multi-level data of C', M', Y' and K' separated into the data of ink colors are respectively converted into data the gradation number of which can be reproduced by the printer in the halftone processing unit 103, and then the printing is performed in the printer 1403.

Hereinafter, the generation method of data downloaded to the ink color separation table unit 105 will be explained in detail with reference to FIGS. 2A to 2C and the following drawings.

Figure 2A:
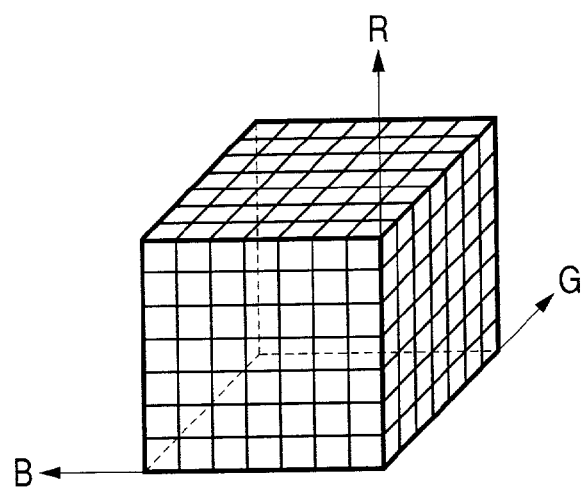
FIGS. 2A, 2B and 2C are views for respectively explaining a table of an ink color separation table unit 105 shown in FIG. 1, a dividing method of dividing an input cube into six tetrahedrons and K ink dyeing points.

FIG. 2A is a view for explaining the ink color separation table unit 105. As shown in FIG. 2A, data corresponding to grid points distributed in grid-like on a cube on an RGB three-dimensional space is stored as a table corresponding to the input color image data of R', G' and B'. In the ink color separation processing unit 102, in a case in which the input color image data of R', G' and B' do not exist on the grid points of the ink color separation table unit 105, the interpolation processing is executed using data of adjacent grid points. As an interpolation method, although there are plural methods such as tetrahedral interpolation, cubic interpolation and the like, any interpolation method may be used because the ink separation table creation method and the image processing of the present embodiment are not dependent on a specific interpolation method.

Figure 2B:
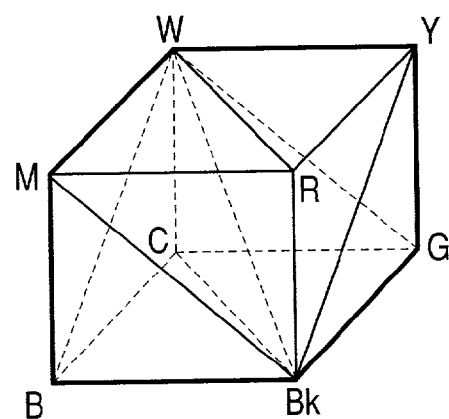
Figure 3:
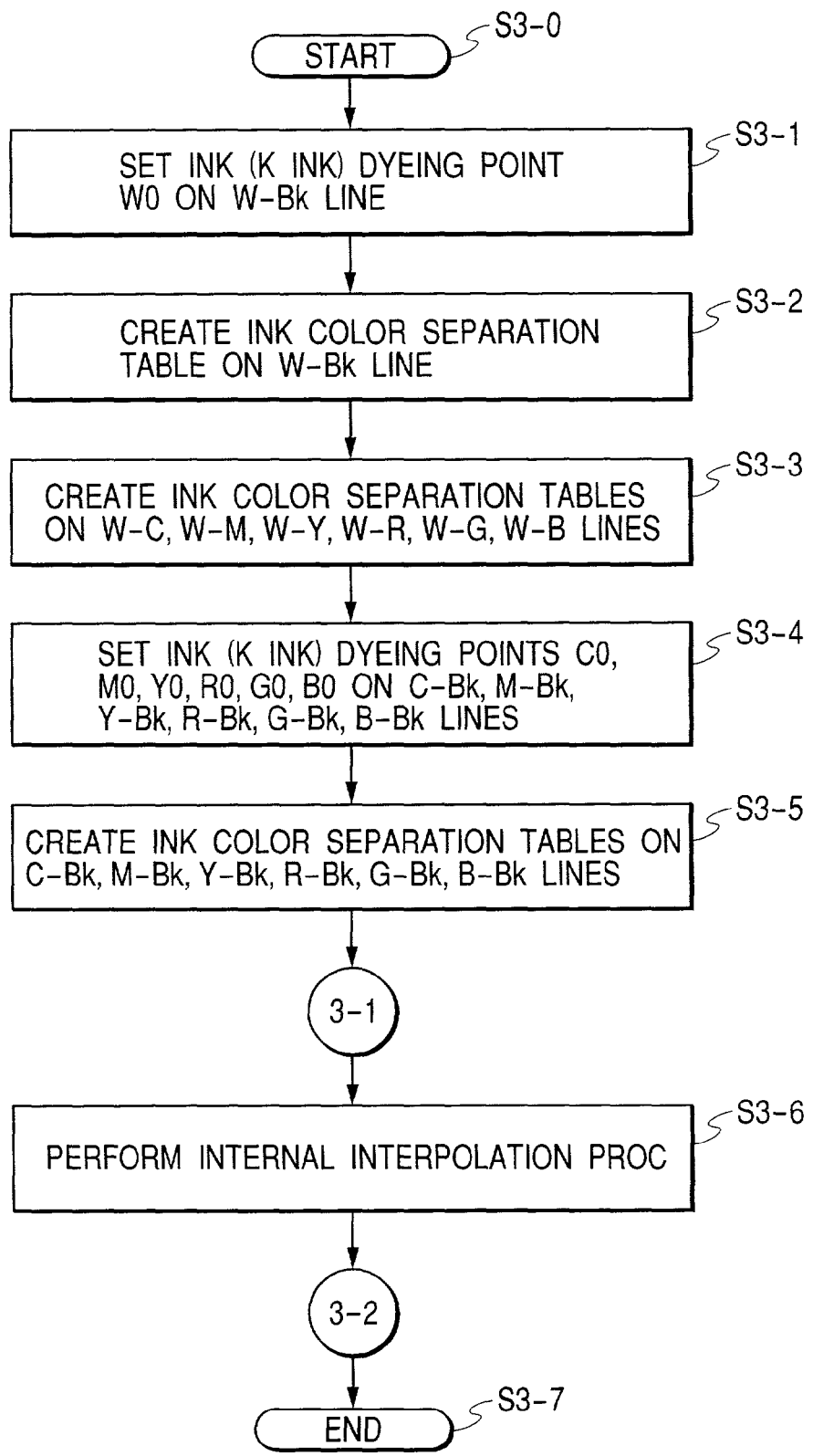
FIG. 3 is a flow chart indicating the basic structure of an ink color separation table creation unit 104 shown in FIG. 1.

FIG. 2B is a view for explaining concrete table creation methods related to FIG. 3 and the following drawings. Eight vertices on the cube shown in FIG. 2A are assumed as W, C, M, Y, R, G, B and Bk, and lines obtained by connecting the above vertexes such as W-C, W-M, W-Y, W-R, W-G and B-Bk are indicated by actual lines or dot lines. When it is assumed that the bit number of input data of the ink color separation processing unit 102 is eight, coordinates of each of the vertices W, C, M, Y, R, G, B and Bk are expressed as follows. That is, W=(255, 255, 255), which indicates white, i.e., the color of the printing paper used, C=(0, 255, 255), which indicates cyan original color, M=(255, 0, 255), which indicates magenta original color, Y=(255, 255, 0), which indicates yellow original color, R=(255, 0, 0), which indicates red original color, G=(0, 255, 0), which indicates green original color, B=(0, 0, 255), which indicates blue original color, and Bk=(0, 0, 0), which indicates black, i.e., the darkest point expressed in the printer.

The ink color separation table creation method according to the present embodiment creates ink color separation tables related to the lines obtained by connecting the above vertices such as W-C, W-M, W-Y, W-R, W-G, B-Bk and W-Bk. Then, with respect to ink colors corresponding to internal grid points, data of all the tables is created by internal interpolation processing.

Figure 2C:
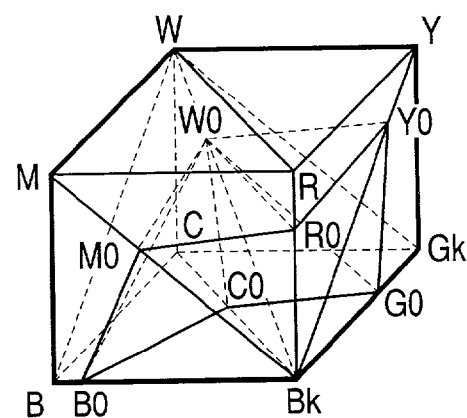

FIG. 2C is a view for explaining ink (K ink) dyeing points and explaining the fact that the ink dyeing points can be three-dimensionally and sequentially controlled by seven dots on the seven lines W-Bk, W-C, W-M, W-Y, W-R, W-G and B-Bk.

FIG. 3 is a flow chart for explaining functions of the ink color separation table creation unit 104.

A step S3-0, which is a start step, starts to create tables to be downloaded to the ink color separation table unit 105.

A step S3-1 is a setting step of setting an ink (K ink) dyeing point W0 on the line W-Bk. The ink (K ink) dyeing point on a gray line changing from white to black is determined using the ink dyeing UI 1402-1 shown in FIG. 14 considering characteristic of the printer 1403. A step S3-2, which is a creation step of creating the ink color separation table of the line W-Bk, creates the ink color separation table of the gray line changing from white to black based on the setting step S3-1 of setting the ink (K ink) dyeing point W0 on the line W-Bk.

A step S3-3, which is a creation step of creating the ink color separation tables of lines W-C, W-M, W-Y, W-R, W-G and W-B, creates the ink color separation tables of the lines White-Cyan, W-magenta, W-Yellow, W-Red, W-Green and W-Blue. A step S3-4, which is a setting step of setting ink (K ink) dyeing points CO, MO, YO, RO, GO, and BO on lines C-Bk, M-Bk, Y-Bk, R-Bk, G-Bk and B-Bk, performs setting of ink (K ink) dyeing start points on the lines Cyan-Black, Magenta-Black, Yellow-Black, Red-Black, Green-Black and Blue-Black using the ink dyeing UI 1402-1 shown in FIG. 14. A step S3-5, which is a creation step of creating the ink color separation tables of the lines C-Bk, M-Bk, Y-Bk, R-Bk, G-Bk and B-Bk, creates the ink color separation tables of the lines Cyan-Black, Magenta-Black, Yellow-Black, Red-Black, Green-Black and Blue-Black.

A step S3-6, which is a step of executing the internal interpolation processing, creates the ink color separation tables corresponding to each of the grid points inside a space defined by the lines formed in the steps S3-1 to S3-5.

Tables in which influence of graininess caused by black ink can be possibly suppressed while maximizing a color reproduction region in the printer, can be set by creating tables of setting optimum UCR (under-color removal) quantity or BG quantity for every hue in processing of the table creation executed in the step S3-5.

Figure 4A:
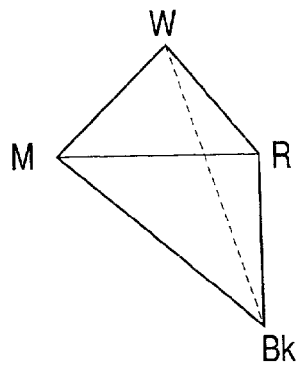
FIGS. 4A, 4B, 4C, 4D, 4E and 4F are views for explaining the divided six tetrahedrons.
Figure 4D:
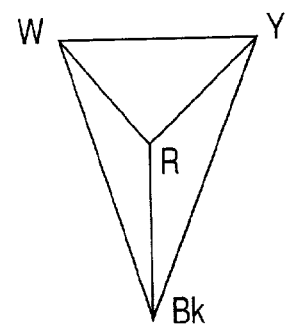
Figure 4B:
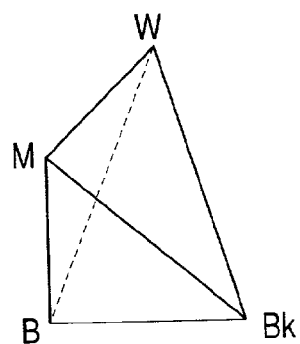
Figure 4E:
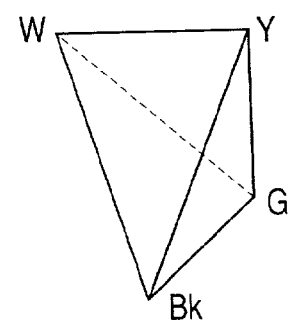
Figure 4C:
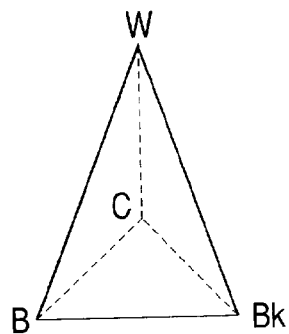
Figure 4F:
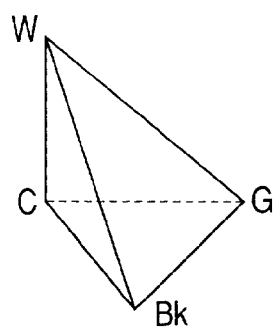

The contents of the internal interpolation processing executed in the step S3-6 will be explained with reference to FIGS. 4A to 4F and the following drawings. In the internal interpolation processing executed in the step S3-6, there are obtained six divided tetrahedrons each plane (face) of which is formed by a triangle as shown in FIGS. 4A to 4F, and the interpolation processing is executed for every tetrahedron. FIG. 4A indicates a tetrahedron structured by vertices W, R, M and Bk. FIG. 4B indicates a tetrahedron structured by vertices W, M, B and Bk. FIG. 4C indicates a tetrahedron structured by vertices W, C, B and Bk. FIG. 4D indicates a tetrahedron structured by vertices W, Y, R and Bk. FIG. 4E indicates a tetrahedron structured by vertices W, Y, G and Bk. FIG. 4F indicates a tetrahedron structured by vertices W, C, G, and Bk.

FIG. 5 is a flow chart for explaining concrete processing of the internal interpolation processing executed in the step S3-6.

A step S5-1, which is an ink color selection step, sequentially selects ink colors of cyan, magenta, yellow and black so as to determine ink quantity corresponding to each of the grids in the following steps. A step S5-2, which is a step of selecting the tetrahedron and dividing (separating) it into plural triangles, sequentially selects the six tetrahedrons shown in FIGS. 4A to 4F, and separates those tetrahedrons into plural triangles. As separating method of separating the tetrahedron into plural triangles, e.g., in a case shown in FIG. 4A, at first, the tetrahedron is separated into four triangles (triangles WMR, WMBk, WRBk and MRBk) which structure the tetrahedron. Then, the interior of the tetrahedron WMRBk is separated into plural triangles by planes parallel to a triangle WRM corresponding to the number of grids.

A step S5-3 is a step of executing two-dimensional interpolation processing on target triangles. The contents of the two-dimensional interpolation processing executed on each of the triangles will be explained in detail with reference to FIG. 6 and the following drawings.

Figure 6:
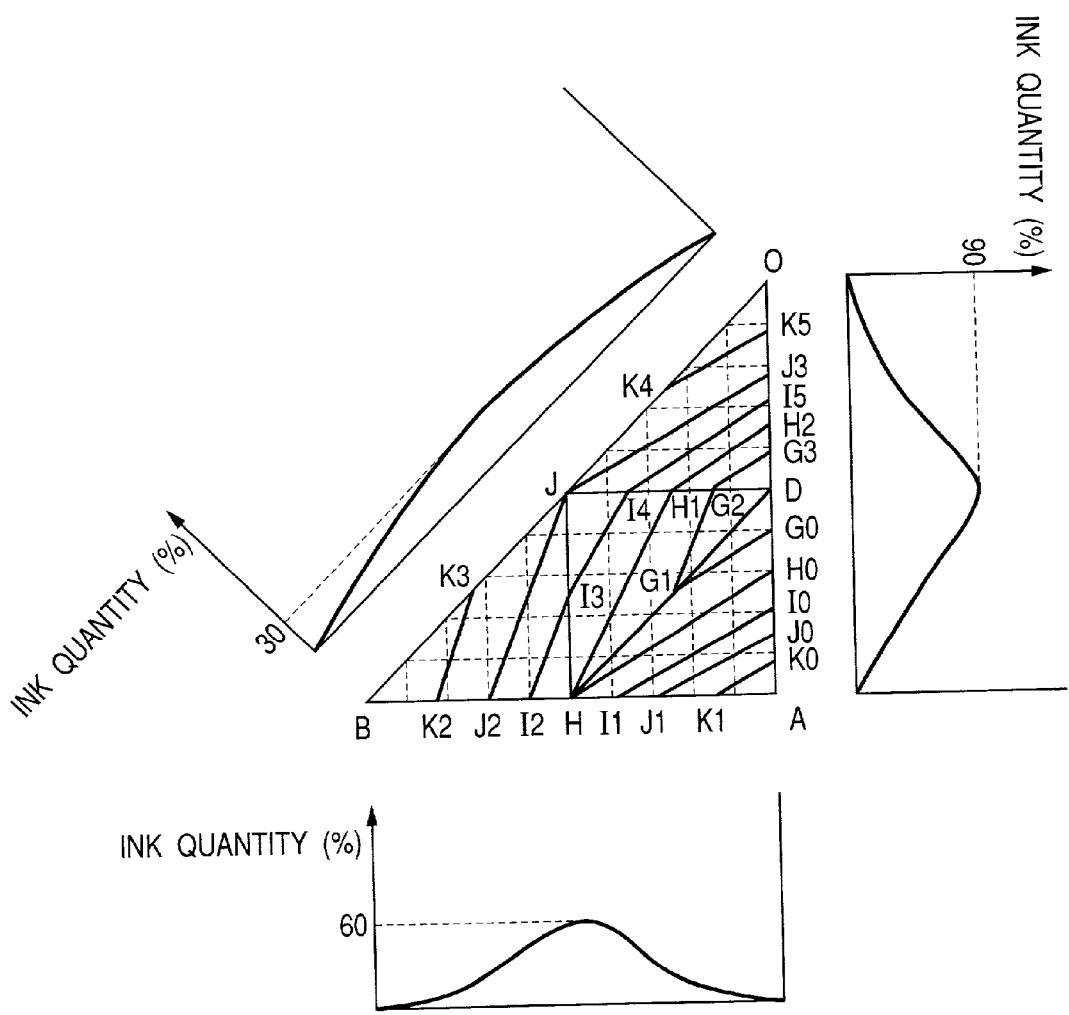
FIG. 6 is a view indicating ink contour lines of an internal interpolation result in a case where changing curves of ink quantity on three sides of a triangle are exemplified.

A step S5-4, which is a calculation step of calculating the distance between an ink contour line of interpolation result and each grid, calculates the distance between each of contour lines shown in FIG. 6 created according to the step S5-3 of executing the two-dimensional interpolation processing and each of the grids corresponding to tables in the ink color separation table unit 105 for each of the triangles.

A step S5-5, which is a step of determining the ink quantity of a target grid, determines the shortest distance calculated according to a result obtained in the step S5-4 (which calculates the distance between the ink contour line of the interpolation result and each grid) as the ink quantity of the target grid.

A step S5-6 is a step of judging whether or not an undecided grid exists. In a case where an undecided grid exists, the flow returns to the step S5-4, then processing related to the steps S5-4 and S5-5 is executed on the next grid. In the triangle which is targeted in the step S5-3, when the ink quantity is determined for all the grids, the flow advances to a step S5-7. The step S5-7, which is a step of judging whether or not an unprocessed triangle exists, judges whether or not processing is terminated for the plural triangles separated in the step S5-2. In a case where an unprocessed triangle exists, the flow returns to the step S5-3, then processing from the step S5-3 to the step S5-6 are repeated. In a case where processing is terminated for all the triangles of the tetrahedron selected in the step S5-2, the flow advances to a step S5-8. The step S5-8 is a step of judging whether or not an unprocessed tetrahedron exists. In a case where an unprocessed tetrahedron exists, the flow returns to the step S5-2, and then processing from the step S5-2 to the step S5-7 is repeated. In a case where processing is terminated for all the tetrahedrons, the flow advances to a step S5-9. The step S5-9 is a step of judging whether or not unprocessed ink color exists. In a case where an unprocessed ink color exists, the flow returns to the step S5-1, and then processing from the step S5-1 to the step S5-8 is repeated. In a case where processing is terminated for all the ink colors, the flow advances to a portion 3-2.

Next, concrete processing contents in the step S5-3 of executing the two-dimensional interpolation processing to the target triangle will be explained with reference to FIG. 6 and the following drawings.

FIG. 6 is a view indicating ink contour lines of the internal interpolation result in a case where ink quantity on three sides of a certain triangle are indicated by curves as shown in FIG. 6. In FIG. 6, change of the ink quantity on a side OA is indicated by a graph which is on the right of the side OA, and a peak of the ink quantity reaches 90%. The change of the ink quantity on a side OB is indicated by a graph which is on the left upper of the side OB, and a peak of the ink quantity reaches 30%. The change of the ink quantity on a side AB is indicated by a graph which is under the side AB, and a peak of the ink quantity reaches 60%.

Figure 7:
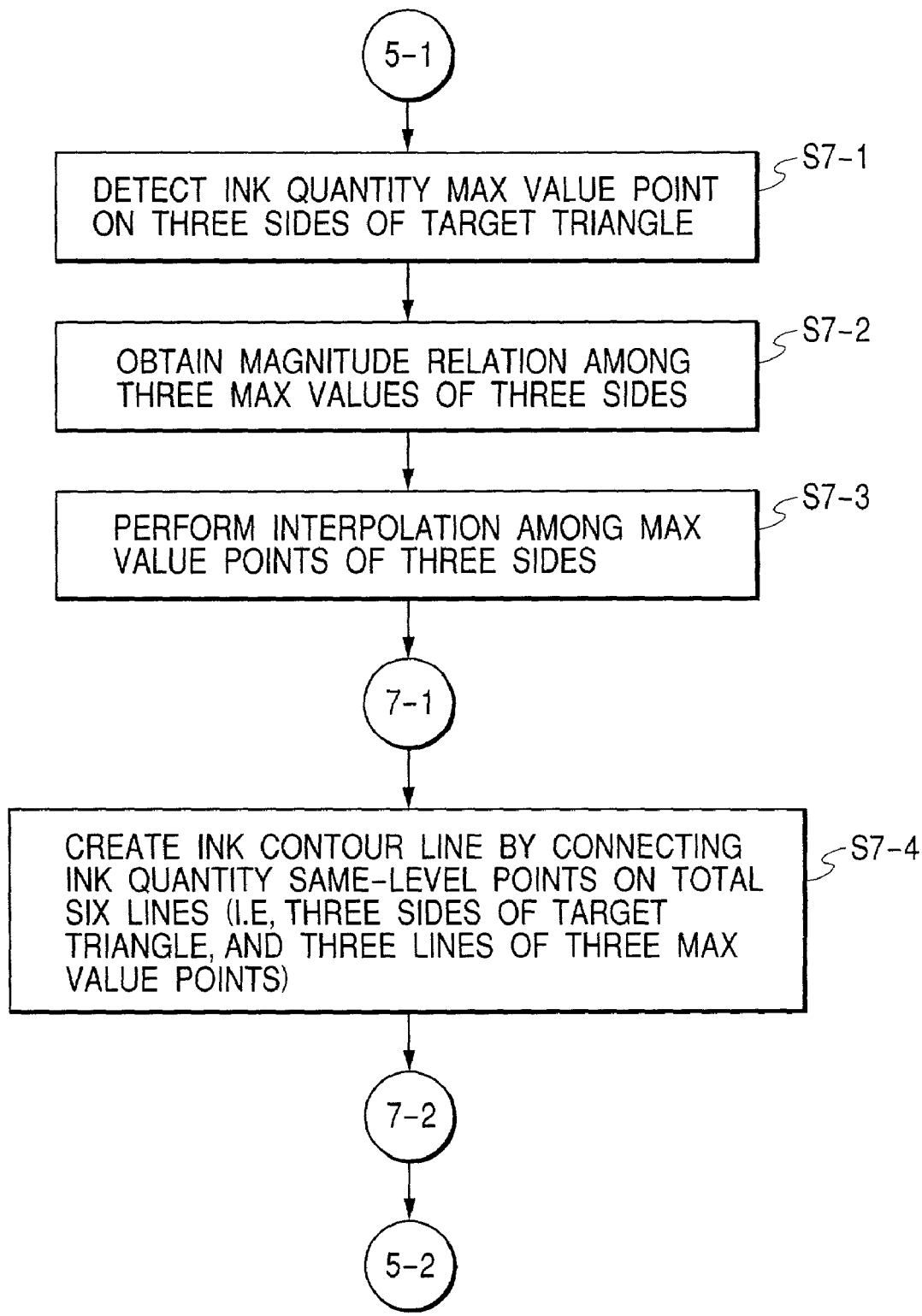
FIG. 7 is a flow chart for explaining two-dimensional interpolation processing executed for a target triangle in a step S5-3 shown in FIG. 5.
Figure 8:
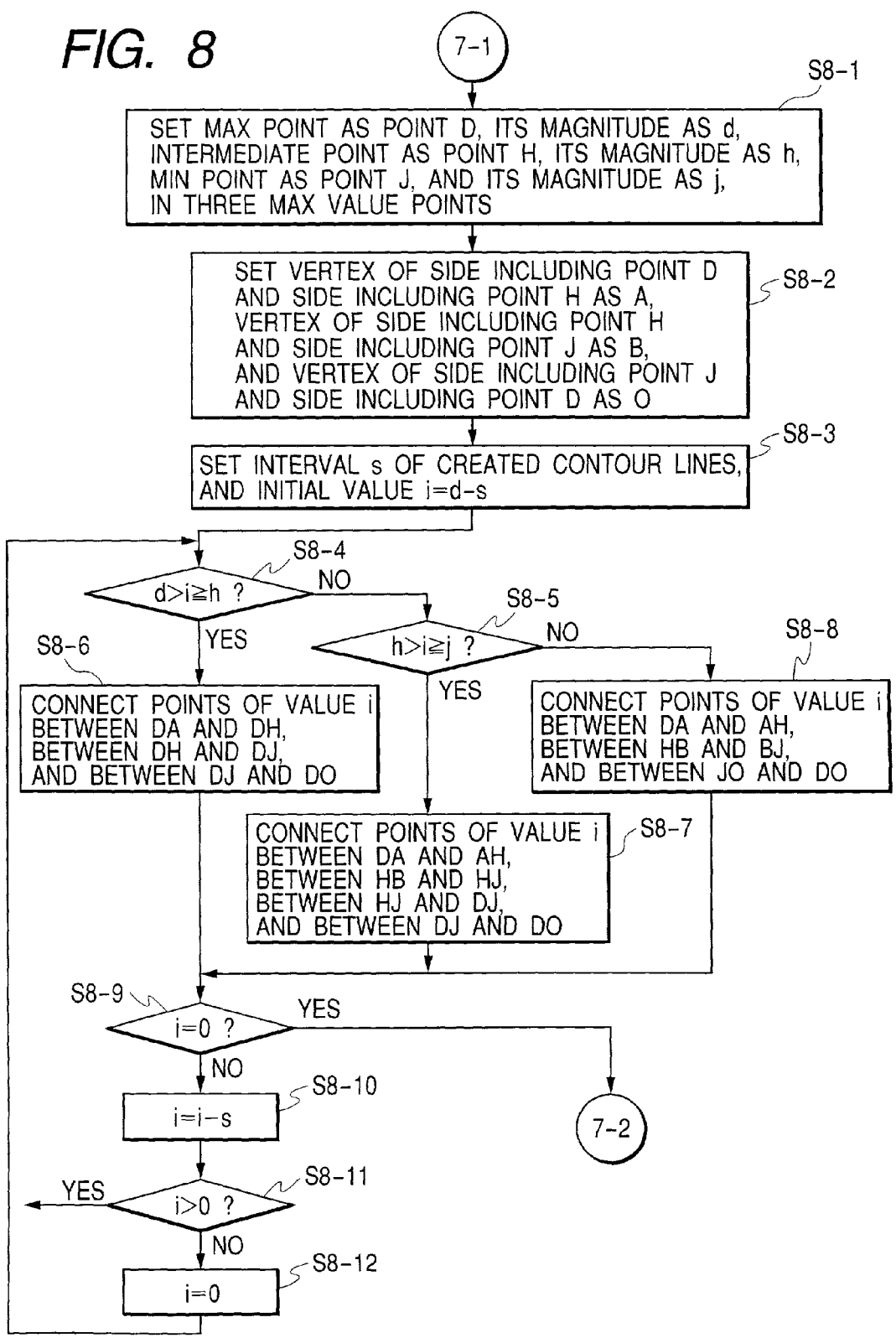
FIG. 8 is a flow chart for explaining processing executed in a step S7-4, where the ink contour line is created by connecting ink quantity same-level points on total six lines consisted of three sides of the target triangle and three lines of three maximum value points.

FIGS. 7 and 8 are flow charts for explaining in detail the two-dimensional interpolation processing executed on the target triangle. Hereinafter, explanations related to FIGS. 7 and 8 are described with reference to a case in FIG. 6 as an example.

In FIG. 7, a step S7-1 is a step of detecting the maximum value points of the ink quantity on three sides of the target triangle. A step S7-2 is a step of obtaining a magnitude relationship among three maximum values of the three sides. A step S7-3, which is an interpolation step among the maximum value points on the three sides, performs an interpolation operation from values of both ends among the points by connecting the points of the three maximum values on the three sides by straight lines. A step S7-4 is a step of creating an ink contour line by connecting ink quantity same-level points on a total of six lines consisting of the three sides of the target triangle and three straight lines created according to the three maximum value points.

Next, a detailed explanation related to the step S7-4 will be given with reference to FIG. 8. In a step S8-1, among the three maximum value points, it is defined that the maximum value point is set as a point D and its magnitude is set as d, the intermediate value point is set as a point H and its magnitude is set as h, and the minimum value point is set as a point J and its magnitude is set as j, based on results obtained in the steps S7-1 and S7-2. In an example shown in FIG. 6, d=90, h=60 and j=30. A step S8-2 is a step of setting such that a vertex obtained by a side including the point D and a side including the point H is set as A, a vertex obtained by the side including the point H and a side including the point J is set as B, and a vertex obtained by the side including the point J and the side including the point D is set as O. A step S8-3 is a step of setting an interval s and an initial value I=d−s of contour lines to be created.

Hereinafter, in a loop from a step S8-4 to a step S8-12, the contour lines are sequentially created until the ink quantity reaches 0. The step S8-4 is a step of judging whether or not the relationship among d, I and h is expressed by d>I≦h. If Yes in the step S8-4, points of the value I between a straight line DA and a straight line DH, between the straight line DH and a straight line DJ and between the straight line DJ and a straight line DO are respectively connected in the step S8-6. In the example shown in FIG. 6, since the interval s between the contour lines is expressed by s=15, a contour line for the initial value I=75 is created as a line G0-G1-G2-G3, and a contour line for the initial value I=60 is created as a line H0-H-H1-H2. If No in the step S8-4, the flow advances to the step S8-5. The step S8-5 is a step of judging whether or not the relationship among h, I and j is expressed by h>I≦j. If Yes in the step S8-5, points of the value I between a straight line DA and a straight line AH, between a straight line HB and a straight line HJ, between the straight line HJ and a straight line DJ and between the straight line DJ and a straight line DO are respectively connected in the step S8-7. In the example shown in FIG. 6, contour lines for the initial value I=45 are created as a line I0-I1 and a line I2-I3-I4-I5, and contour lines for the initial value I=30 are created as a line J0-J1 and a line J2-J-J3. If No in the step S8-5, the flow advances to the step S8-8. The step S8-8 is a step of respectively connecting points of the value I between the straight line DA and the straight line AH, between the straight line HB and a straight line BJ and between the straight line JD and the straight line DO. In the example shown in FIG. 6, contour lines for the initial values I=15 are created as a line K0-K1, a line K2-K3 and a line K4-K5. The step S8-9 is a step of judging whether or not the initial value I is expressed by I=0. If Yes in the step S8-9, creation of the contour lines for all the target triangles is terminated, and the flow advances to a portion 7-2. If No in the step S8-9, the flow advances to the step S8-10. In the step S8-10, an operation of I=I−s is performed. In the step S8-11, it is judged whether or not I>0. If Yes in the step S8-11, the flow returns to the step S8-4. If No in the step S8-11, an operation of I=0 is performed in the step S8-12, and the flow returns to the step S8-4. As explained above, loop processing from the step S8-4 to the step S8-12 is repeated until the contour line value is settled into a state of I=0. In FIG. 6, an example of setting the interval s as s=15 is indicated in order to simplify the explanation. However, in order to make a more precise grid value, it is needless to say that the contour line should be created for every step, by setting s=1.

Figure 10:
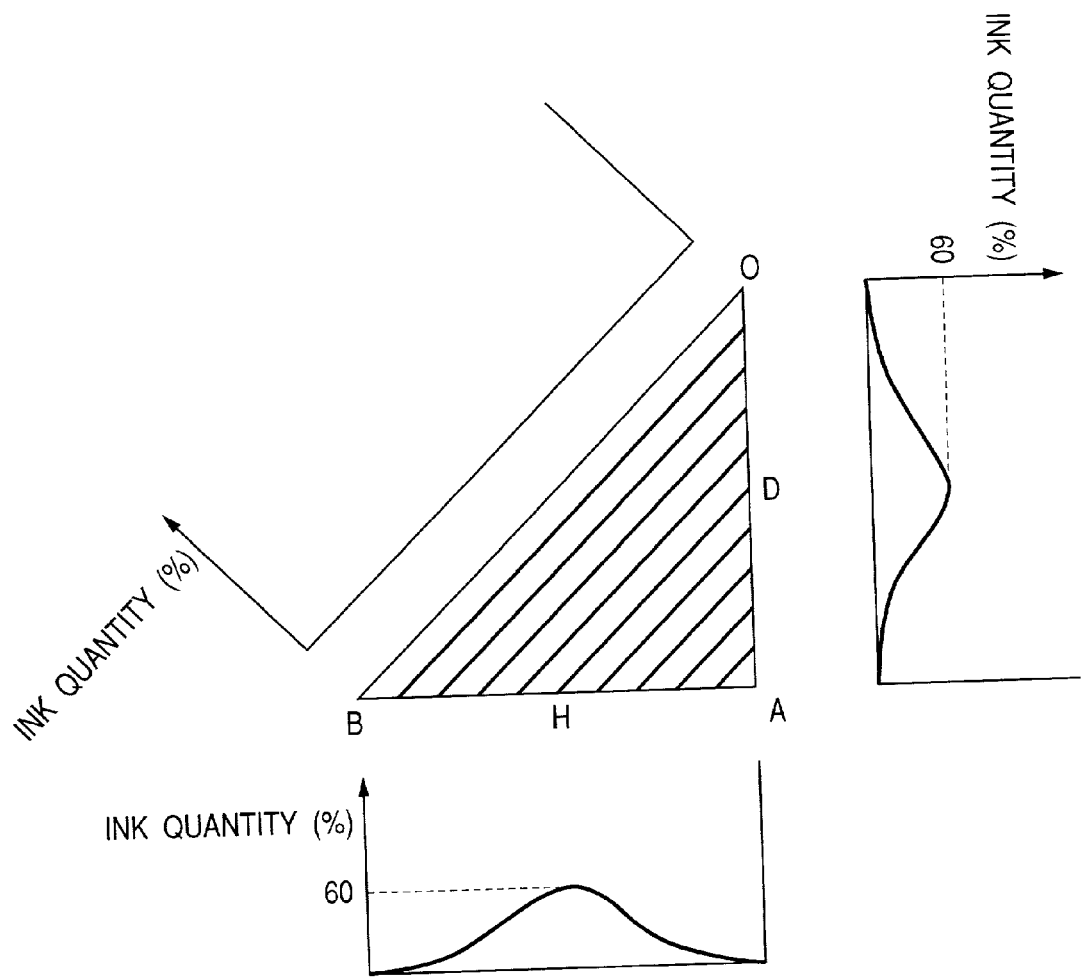
FIG. 10 is a view for explaining creation of the contour line of the target triangle in a case where the maximum values on two sides are identical to each other and the maximum value on one side is equal to zero.
Figure 11:
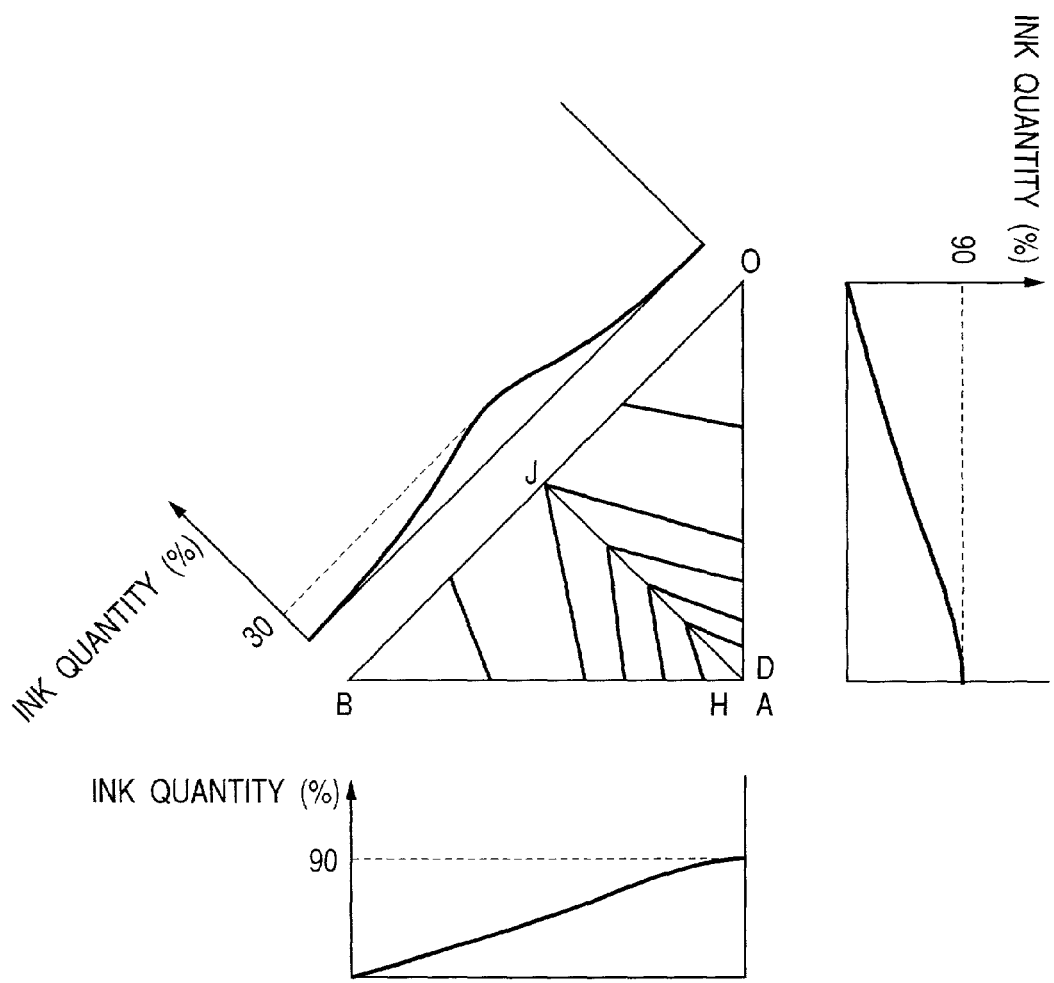
FIG. 11 is a view for explaining creation of the contour line of the target triangle in a case where the maximum values on two sides are identical each other and points of the maximum values exist on one vertex.

Hereinafter, with respect to a case in which ink curves of three sides are different from those shown in FIG. 6, its operations will be explained regarding examples shown in FIGS. 9, 10 and 11.

Figure 9:
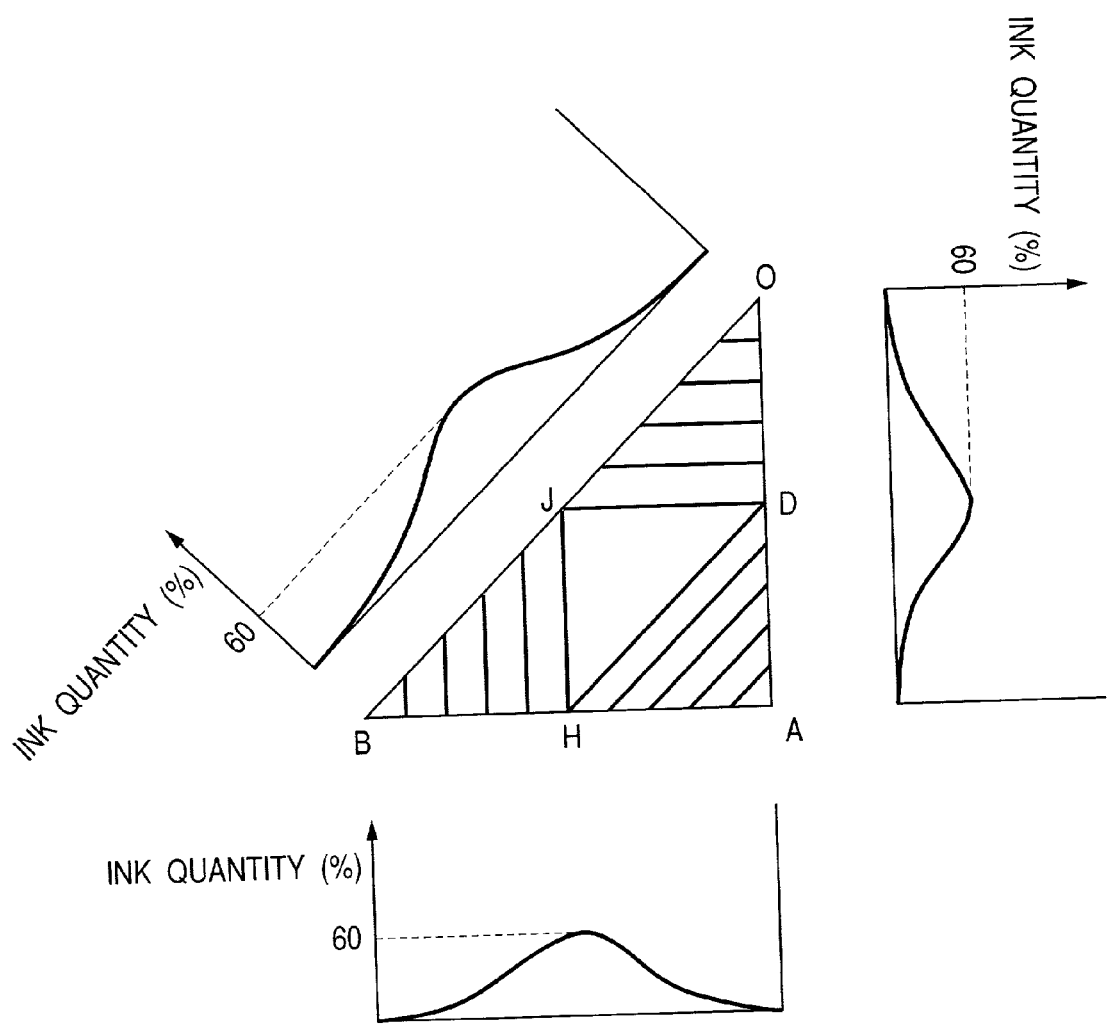
FIG. 9 is a view for explaining creation of the contour line of the target triangle in a case where ink quantity maximum values on three sides are identical to each other.

FIG. 9 shows an example of a case in which the ink quantity maximum values on the three sides are identical to each other. In this case, although it is not specified in FIG. 8, only the step S8-8 (the step of creating the contour lines) is executed, and contour lines as shown in FIG. 9 are created. FIG. 10 shows a case in which the ink quantity on one side is equal to zero and the maximum values on other two sides are identical to each other. In this case, points of the value I between the straight line DA and the straight line AH and between the straight line HB and the straight line DO are respectively connected, and contour lines as shown in FIG. 10 are created. FIG. 11 shows a case in which the maximum values on the two sides are identical to each other and points of these maximum values exist on a point A. In this case, since points D, A and H are the same point, contour line creating processing is not executed in the step S8-6 shown in FIG. 8. In the step S8-7, the contour line does not exist because the points D, A and H are the same point: between the straight line DA and the straight line AH, the contour line creating processing is not executed because the points D and H are the same point between the straight line HJ and the straight line DJ, and processing of respectively connecting the points of the value I is executed only between the straight line HB and the straight line HJ and between the straight line DJ and the straight line DO. In the step S8-8, the contour line does not exist because the points D, A and H are the same point: between the straight line DA and the straight line AH, and processing of respectively connecting the points of the value I is executed only between the straight line BJ and a straight line JO and between the straight line JO and the straight line DO, then contour lines as shown in FIG. 11 are created.

Figure 12:
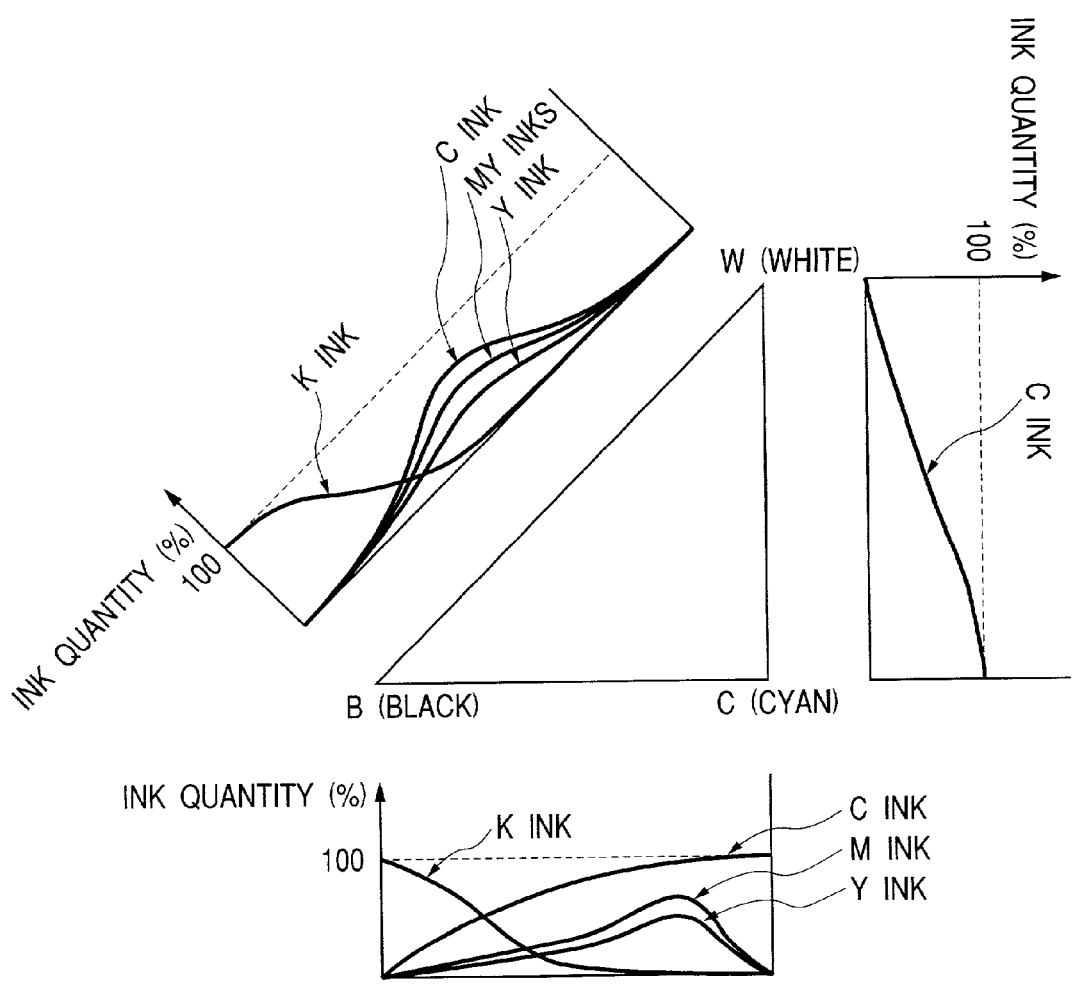
FIG. 12 is a view for explaining an example of interpolation processing executed inside a triangle formed by connecting vertices W-C-Bk shown in FIG. 2, and indicating examples of the C, M, Y and K ink quantity curves on each side.
Figure 13A:
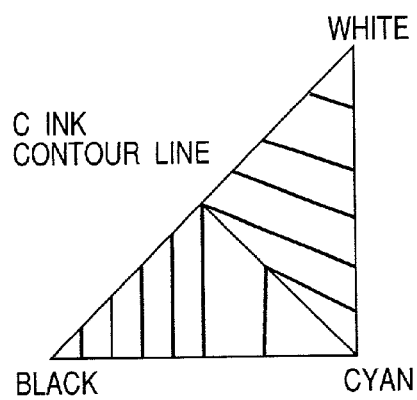
FIGS. 13A, 13B, 13C and 13D are views showing the contour lines of each ink in the target triangle shown in FIG. 12.
Figure 13B:
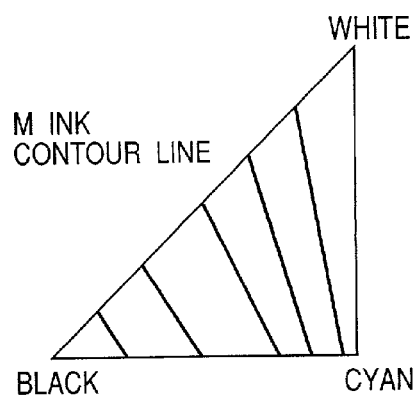
Figure 13C:
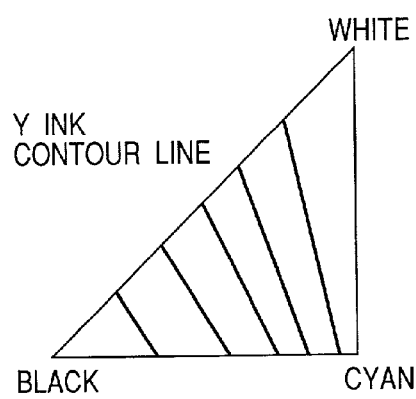
Figure 13D:
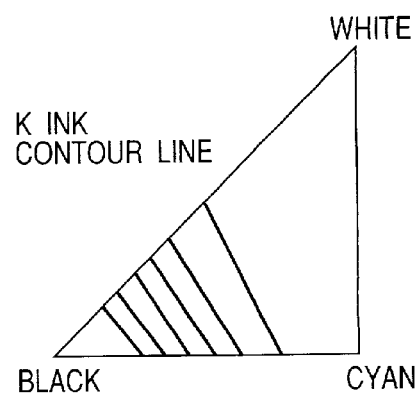

FIG. 12 is a view for explaining an example of interpolation processing executed inside a triangle formed by vertexes W-C-Bk shown in FIG. 2, and indicating examples of curves related to ink color tables of the C, M, Y and K colors on each of sides. FIGS. 13A to 13D show the contour lines for every ink color in FIG. 12. FIG. 13A indicates the contour lines of C ink and this case corresponds to a case in FIG. 11. FIG. 13B indicates the contour lines of M ink and this case corresponds to a case in FIG. 10. FIG. 13C indicates the contour lines of Y ink and this case also corresponds to the case in FIG. 10. FIG. 13D indicates the contour lines of K ink and this case corresponds to the case in FIG. 10; however, since the K ink is injected from halfway, the region in which the ink quantity is zero is extensive, and the contour lines of the K ink are created from halfway.

In this manner, in the present embodiment, the internal interpolation processing is correspondingly executed for every ink color on the basis of ink quantity curves on three sides of a triangle, and then the optimum and independent ink contour lines are created from the ink quantity curves on the three sides. Therefore, by controlling the ink (K ink) dyeing points on a gray axis and six hues, i.e., seven ink (K ink) dyeing points on tables of seven lines W-Bk, C-Bk, M-Bk, Y-Bk, R-Bk, G-Bk and B-Bk, the tables of the ink color separation table unit 105 can be controlled in an input color space in a manner that the ink (K ink) dyeing points can be three dimensionally and sequentially controlled by total six planes of triangles WO-RO-MO, WO-MO-BO, WO-BO-CO, WO-CO-GO, WO-GO-YO and WO-YO-RO. Accordingly, tables in which the optimum UCR quantity or the optimum BG quantity is set for every hue, are created, and tables in which influence of graininess caused by the black ink can be possibly reduced while maximizing the color reproduction region in the printer, can be set.

In the conventional system, since non-linear characteristics in a case of the mixture of plural color inks can not be sufficiently absorbed, there occurred a problem that distorted characteristics appeared in lightness, hue and chroma. However, according to the present embodiment, the internal ink quantity can be smoothly changed by a method of dividing a cube into plural tetrahedrons, separating those tetrahedrons into plural triangles and connecting points of the same level value of the ink quantity on the three sides of each triangle, thereby realizing color reproduction while suppressing the distortion of characteristics in the lightness, the hue and the chroma.

In the K ink dyeing UI 1402-1 shown in FIG. 14, since the K ink dyeing points on each line set in the step S3-4 shown in FIG. 3 can be manually instructed, a sensitive adjustment can be performed.

SECOND EMBODIMENT

Figure 15:
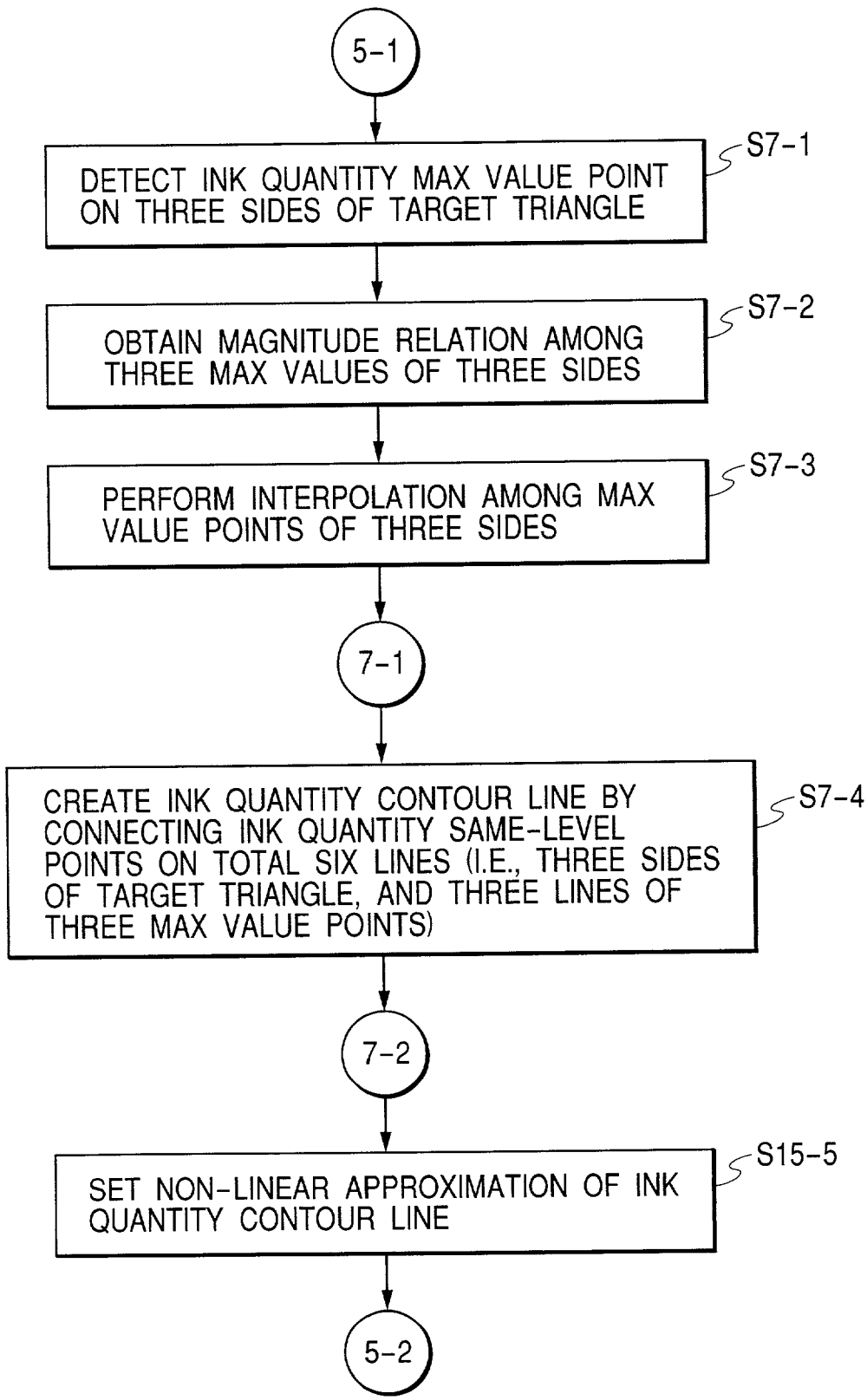
FIG. 15 is a flow chart for explaining two-dimensional interpolation processing executed in a second embodiment.
Figure 16:
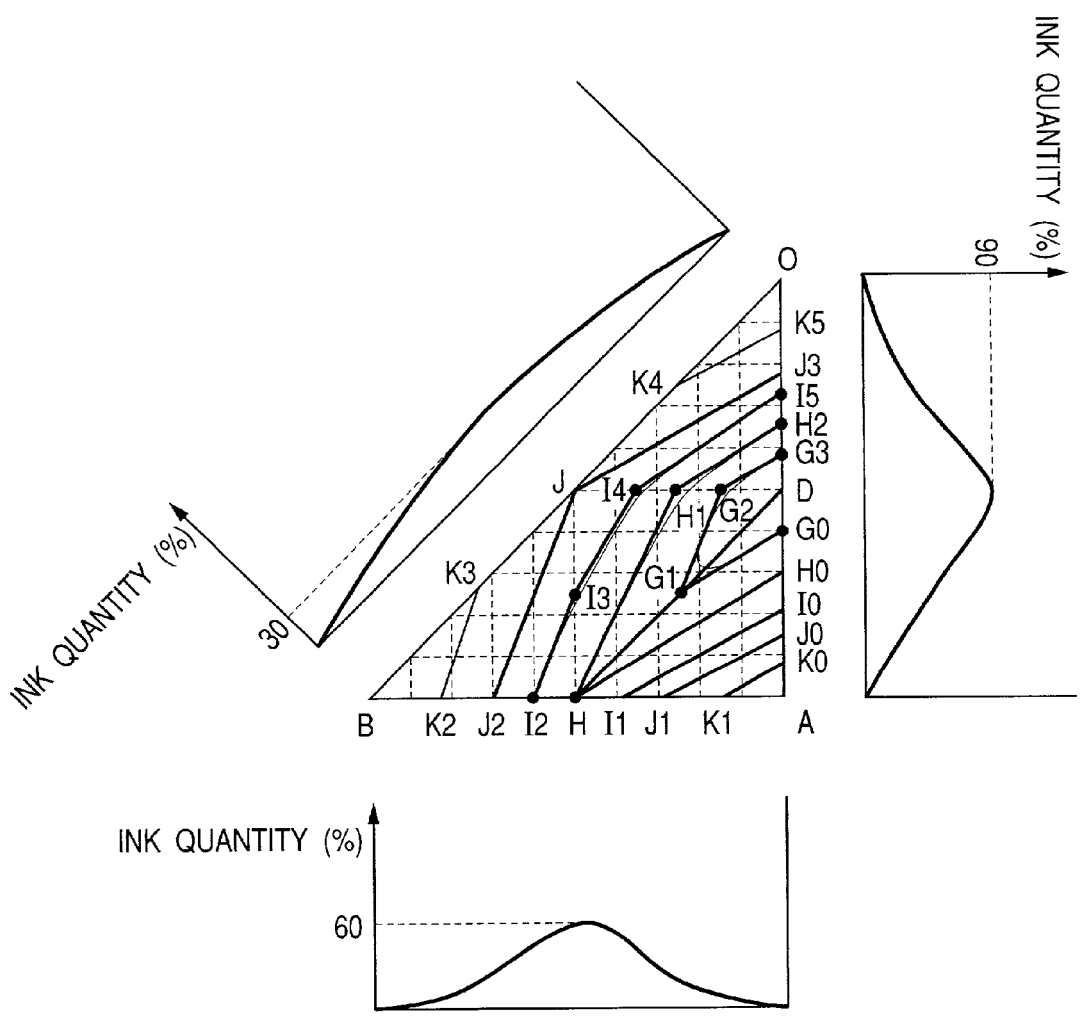
FIG. 16 is a view indicating ink contour lines according to an internal interpolation processing result in the second embodiment.

The second embodiment, which is obtained by modifying the first embodiment, executes non-linear approximation processing of ink quantity contour lines as in FIG. 16 in a step S7-5 shown in FIG. 15.

According to the second embodiment, a contour line varying rectangularly can be corrected into a contour line which is smoothly and sequentially varied.

Accordingly, generation of a pseudo-outline, even in cases of extreme changes in the ink quantity, can be suppressed.

In the following explanation, the processing that is the same as that in the first embodiment will be omitted from the explanation, and only processing different from that in the first embodiment will be explained.

In a case of executing two-dimensional interpolation processing on a target triangle in the step S5-3 shown in FIG. 5, the non-linear approximation processing of the above ink quantity contour lines is executed.

The two-dimensional interpolation processing for the target triangle executed in the second embodiment will be explained with reference to FIG. 15.

The step S7-1 is a step of detecting maximum value points of the ink quantity on three sides of the target triangle. The step S7-2 is a step of obtaining the magnitude relationship among three maximum values of the three sides. The step S7-3, which is an interpolation step of interpolation among the maximum value points on the three sides, performs an interpolation operation from values of both ends among the points by connecting the points of the three maximum values on the three sides by straight lines. The step S7-4 is a step of creating an ink contour line by connecting ink quantity same-level points on a total of six lines, consisting of the three sides of the target triangle and three straight lines created according to the three maximum value points. A step S15-5, which is a step of executing the non-linear approximation processing of the ink quantity contour lines, non-linearly approximates a portion of rectangularly changing in a region inside the triangle among the ink quantity contour lines created in the step S7-4 such that the ink quantity contour lines are smoothly created.

It should be noted that processing executed in the steps S7-1 to S7-4 is the same as in the first embodiment.

Figure 17:
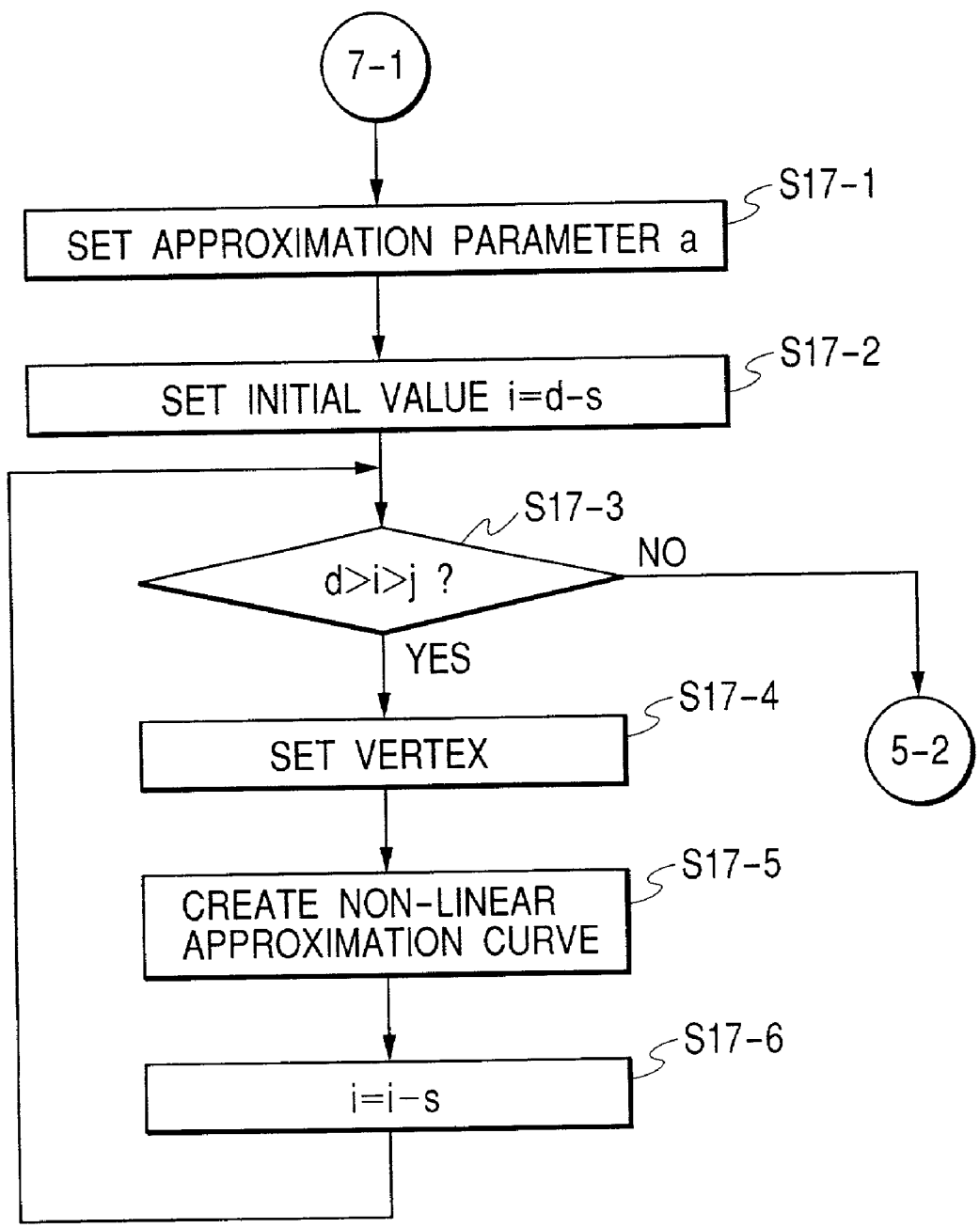
FIG. 17 is a view for explaining the concrete contents of a non-linear approximation step.

A detailed explanation of the step S15-5 will be given with reference to FIG. 17.

Figure 18:
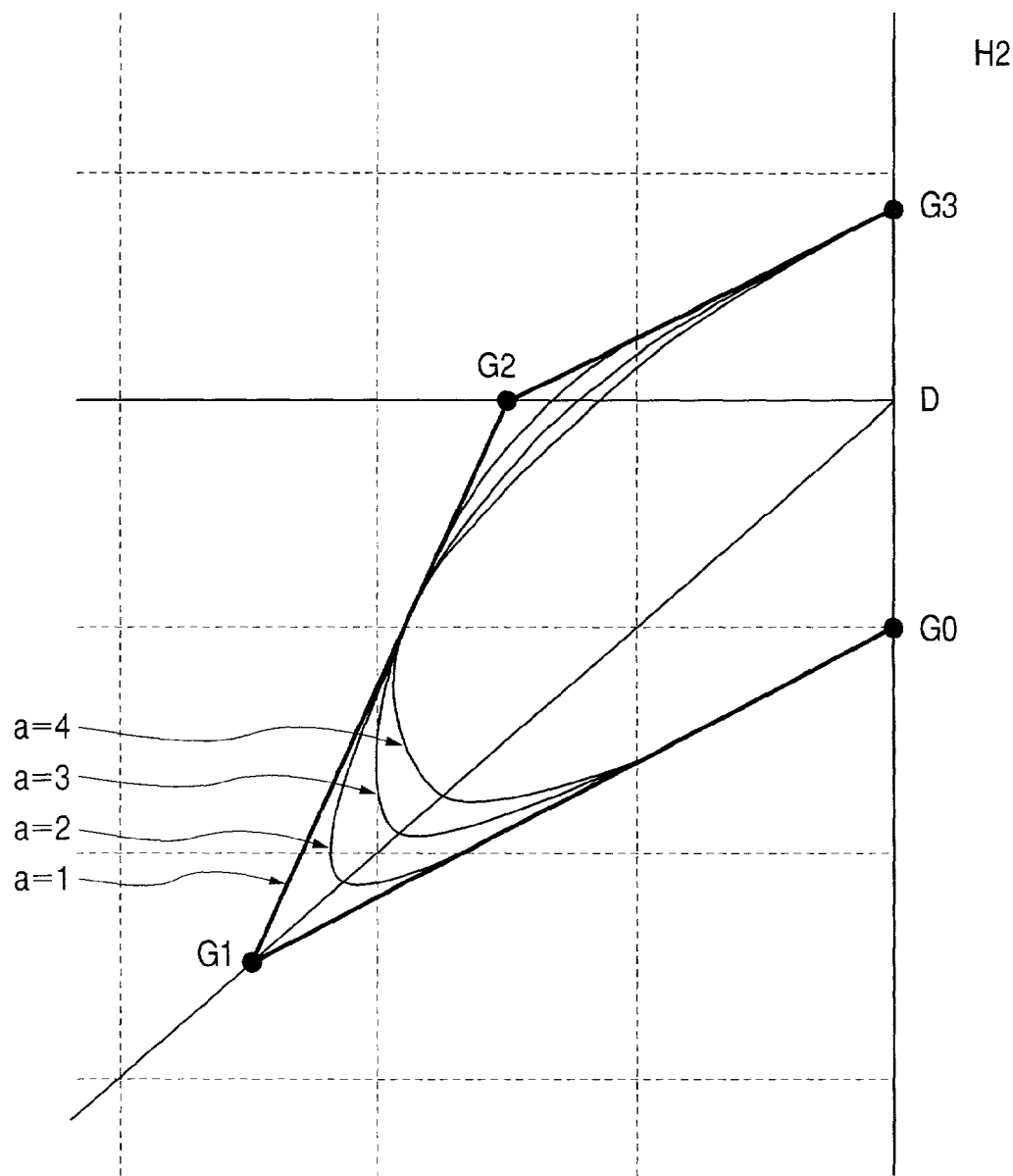
FIG. 18 is a view for explaining an approximation curve when a value of an approximation parameter a is varied in a step S9-1, where the approximation parameter a is set.

A step S17-1, which is a step of setting an approximation parameter a, sets the non-linearity degree in a case of creating non-linear approximation curves. The approximation parameter a can be set as a=1, 2, 3, 4, . . . . As in FIG. 18, when the parameter a is set as a=1, the approximation degree increases with linear approximation, and when the parameter a is increased as a=2, 3, 4, . . . , the approximation degree decreases, while the smoothness of the ink quantity contour lines increases. A user can set the approximation parameter a in accordance with characteristic of a printer. Although there are various methods that can be used as the method of creating the non-linear approximation curves, e.g., in a case of using spline curves, creation of the non-linear approximation curves can be attained by setting that when the parameter a=1, a curve is a primary spline curve, when the parameter a=2, a curve is a secondary spline curve, when the parameter a=3, a curve is a tertiary spline curve, and when the parameter a=4, a curve is a quartic spline curve.

A step S17-2, which is a step of setting an initial value I=d−s, sets the initial value of the ink quantity contour line in case of executing the non-linear approximation processing. A step S17-3 is a step of judging whether or not the relationship among d, I and j is expressed by d>I>j. If No in the step S17-3, the flow returns to a portion 5-2 to terminate the non-linear approximation processing of the ink quantity contour lines. If Yes in the step S17-3, the flow advances to a step S17-4.

The step S17-4, which is a step of setting vertices, sets vertices G0, G1, G2 and G3 structuring a contour line when the initial value I is set as I=75 in an example in FIG. 16. A step S17-5, which is a step of creating the non-linear approximation curves, creates non-linear curves on the basis of a set value of the approximation parameter a and set vertices. In an example in FIG. 16, for the vertices G0, G1, G2 and G3 respectively connected by a thin line, the approximation curve represented by a thick line is created. A step S17-6 is a step of performing an operation of setting I=I−s. In the example in FIG. 16, the value of I is set as I=60, and thereafter, a loop processing from the step S17-3 to the step S17-6 is repeated.

When the value of I is set as I=60, vertices H, H1 and H2 are selected in the step S17-4 and the non-linear approximation curve is created in the step S17-5. When the value of I is set as I=45, vertices 12, 13, 14 and 15 are selected in the step S17-4 and the non-linear approximation curve is created in the step S17-5.

When the value of I is set as I=30, a judgment result of No is selected in the step S17-3, and the flow returns to a portion 5-2.

Hereinafter, with respect to a case that the ink quantity curves on the three sides are different from those in the example in FIG. 16, operations regarding examples in FIGS. 9, 10 and 19 will be explained. FIG. 9 shows an example of a case in which the ink quantity maximum values on the three sides are identical to each other. In this case, the contour lines as shown in FIG. 11 are created similarly to the case of the first embodiment. FIG. 10 shows a case in which the ink quantity on one side is equal to zero and the maximum values on other two sides are identical to each other. Also, in this case, the contour lines as shown in FIG. 10 are created similarly to the case of the first embodiment. FIG. 13 shows a case in which the maximum values on the two sides are identical to each other and points of these maximum values exist on a point A. In this case, the non-linear approximation processing of the ink contour lines as in the step S15-5 is executed, and contour lines as shown in FIG. 19 are created.

The ink contour lines for every ink color are shown in FIGS. 20A to 20D.

Figure 19:
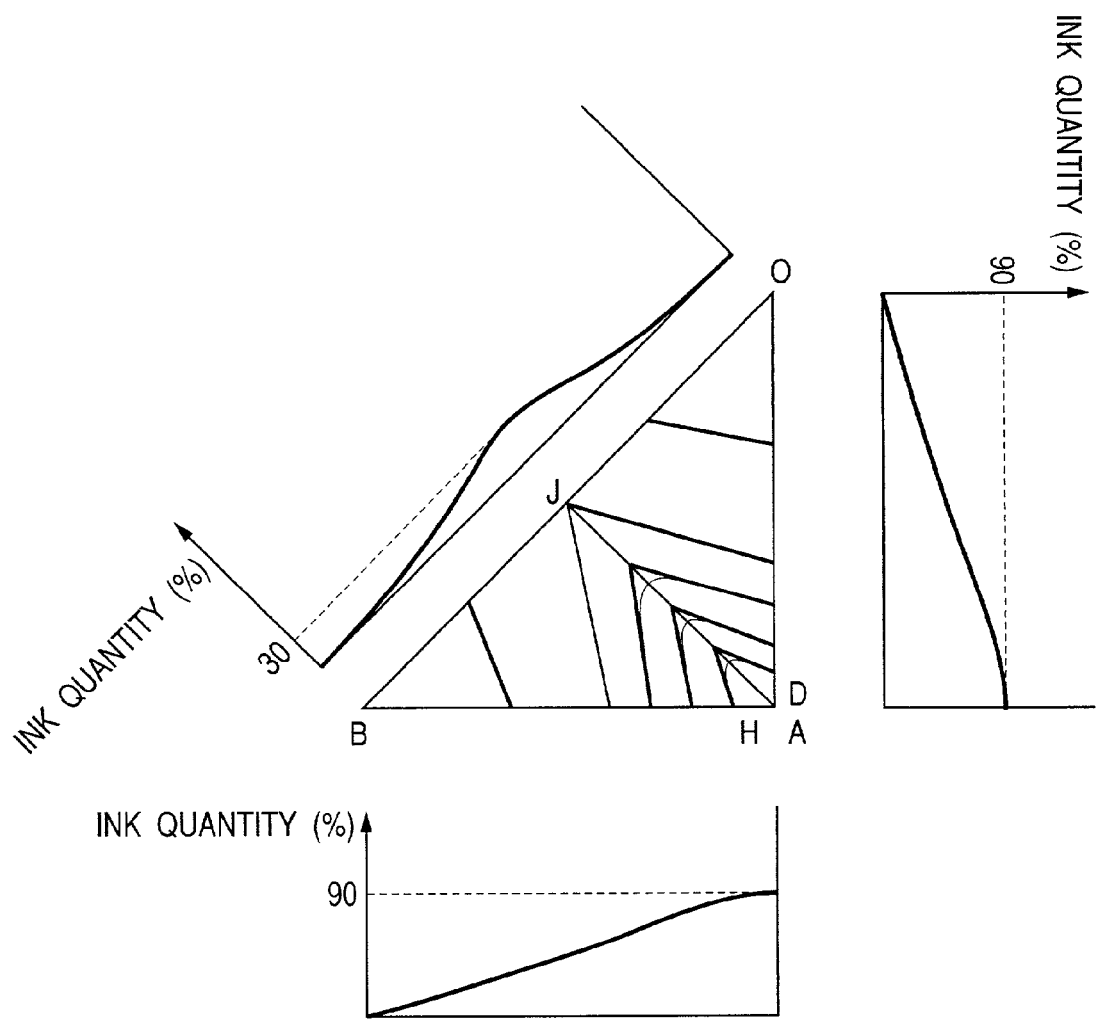
FIG. 19 is a view for explaining creation of the contour line of the target triangle in a case where the maximum values on two sides are identical to each other and points of the maximum values exist on one vertex.
Figure 20A:
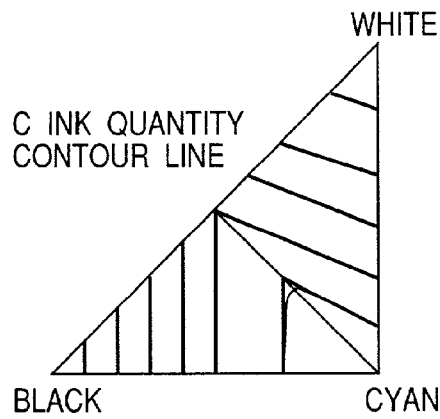
FIGS. 20A, 20B, 20C and 20D are views for explaining the contour lines of each ink in the target triangle.
Figure 20B:
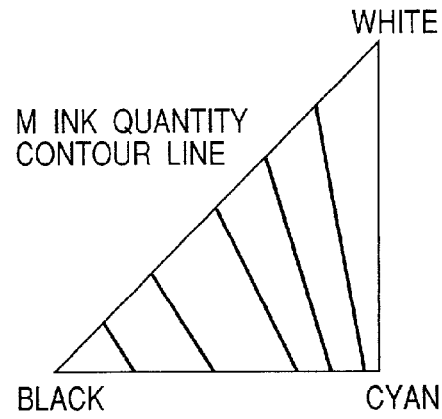
Figure 20C:
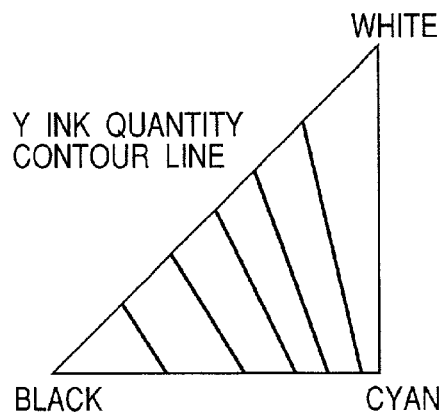
Figure 20D:
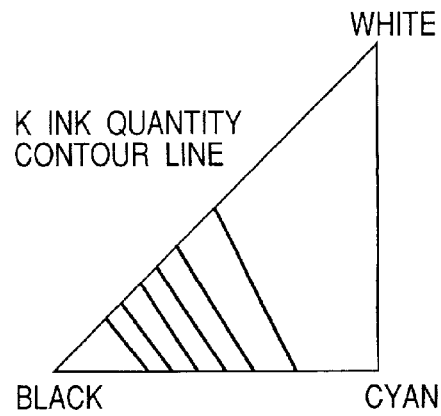

FIG. 20A indicates the contour lines of the C ink quantity, and this case corresponds to a case in FIG. 19. FIG. 20B indicates the contour lines of the M ink quantity, and this case corresponds to the case in FIG. 10. FIG. 20C indicates the contour lines of the Y ink quantity, and this case also corresponds to the case in FIG. 10. FIG. 20D indicates the contour lines of the K ink quantity. This case corresponds to the case in FIG. 10; however, since the K ink is injected from halfway, the region in which the ink quantity is zero is extensive, and the contour lines of the K ink quantity are created from halfway.

THIRD EMBODIMENT

Figure 21:
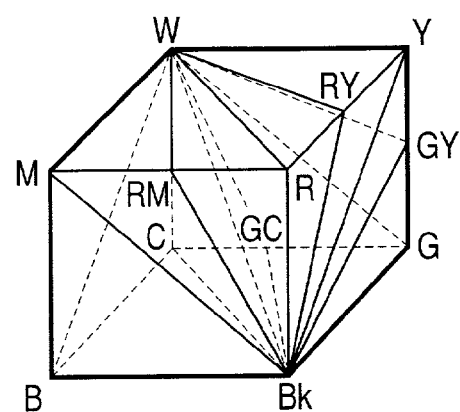
FIG. 21 is a view for explaining a method of dividing an input cube into eight tetrahedrons in a case where red or green ink is used.
Figure 22:
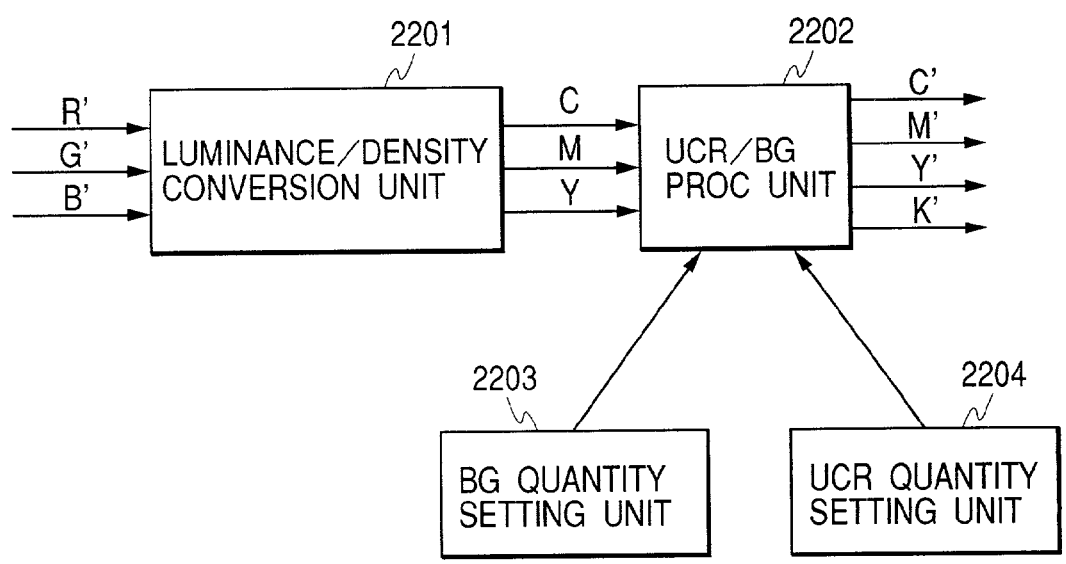
FIG. 22 is a view for explaining processing for separating color data into color of coloring agent available in a conventional color printer.

In the above embodiments, as ink colors available in a printer, a case of using four colors of C, M, Y and K is indicated. However, those embodiments can easily be applied to a printer in which are available a total of six colors, additionally using light and dark inks for cyan and magenta; this can be easily simply by adding two ink colors. In this case, similar to a case of setting the ink (K ink) dyeing point, a new UI of setting a dark ink dyeing start point is provided for the case in FIG. 21, and dark cyan and dark magenta ink dyeing points can be controlled in a manner such that dark ink dyeing points can be three-dimensionally and sequentially controlled by a total of seven points on lines W-Bk, W-C, W-M, W-Y, W-R, W-G and B-Bk.

In a case of dealing with another color ink than the C, M, Y and K colors, such as red, green or the like, intermediate points RM, RY, GY, and GC are newly set on intermediate portions between points R and M, R and Y, G and Y, and G and C. Then, a total of ten tetrahedrons of W-C-B-Bk, W-B-M-Bk, W-M-RM-Bk, W-RM-R-Bk, W-R-RY-Bk, W-RY-Y-Bk, W-Y-GY-Bk, W-GY-G-Bk, W-G-GC-Bk and W-GC-C-Bk are defined, thereby easily providing the optimum ink color separation in the printer available for six colors even in a case in which an increased number of ink colors is used.

In this manner, in a case of using light color ink other than colors of the C, M, Y and K inks, optimum color separation can be provided.

Similarly, in a case of using another color ink such as red, green or the like, optimum color separation can be provided.

FOURTH EMBODIMENT

The above embodiments are performed by a controller inside the printer. However, the present invention is not limited to such case, but can be realized also in a case of downloading related data to a LUT in software of a driver inside a computer (see FIG. 14).

FIFTH EMBODIMENT

In the above embodiments, as a device for outputting image data to the printer, the computer as shown in FIG. 14 is used. However, the device used for this purpose is not limited to a computer, but a device that can transmit image data to the printer such as one capable of temporarily storing image data taken by a digital camera or the like and transmitting the image data to the connected printer, is applicable as well.

In the above-described embodiments, the device for transmitting the image data and the printer exist independently of each other. However, the present invention can be conducted by only the printer itself, in a case where the image data which is input by input means such as a digital camera or the like is stored in any memory medium, and equipment for capturing the image data in that memory medium is attached to the printer itself.

SIXTH EMBODIMENT

In the above embodiments, as shown in FIG. 14, as an input device for inputting patch samples, a colorimeter is used. However, the input device is not limited to the colorimeter but may be any device such as a flat-bed scanner, a drum scanner or the like which can capture print data into the computer and check characteristics of inks used in the printer.

SEVENTH EMBODIMENT

In the above embodiments, as an input color space of an ink color separation table for defining a color reproduction region of a color printer, an RGB color space is used. However, the input color space is not limited to the RGB color space but may be any one capable of three-dimensionally defining the color reproduction region of the printer according to C, M and Y data or three parameters of a, c and b.

OTHER EMBODIMENTS

The present invention includes a case where program codes of software for realizing functions of the above embodiments are supplied to an apparatus connected to various devices or a computer in a system so as to realize the functions of the above embodiments and operate the various devices, and then the various devices are to be operated in accordance with programs stored in the computer (or CPU or MPU) in the system or the apparatus.

In this case, the program codes themselves of the software realize the functions of the embodiments, and the program codes themselves and means for supplying the program codes to the computer, e.g., a storage medium storing such the program codes, constitute the present invention.

The storage medium for storing the program codes can be, e.g., a floppy disk, a hard disk, an optical disk, a magneto-optical disk, a CD-ROM, a magnetic tape, a non-volatile memory card, a ROM or the like.

It is needless to say that the program codes are included in the embodiments of the present invention not only in a case where the functions of the above embodiments are realized by the execution of the supplied program codes by the computer, but also in a case where the program codes realize the functions of the above embodiments cooperating with an OS (operating system) functioning on the computer or other application software.

Further, it is needless to say that the present invention includes a case where the supplied program codes are once stored in a memory provided in a function expansion board inserted in the computer or a function expansion unit connected to the computer, and then a CPU or the like provided in the function expansion board or the function expansion unit executes all the processing or a part thereof on the basis of the instructions of the program codes, thereby realizing the functions of the above embodiment.

As above, the present invention has been explained on the basis of the preferable embodiments. However, the present invention is not limited to the above embodiments, but may be modified in various manners within the scope of the following claims.

What is claimed is:

1. An image processing method which creates a table of an image formation apparatus for performing an image formation using plural coloring agents having different densities for the same color, wherein:
   a first line from black to white is defined;
   plural second lines from white to a primary color and a secondary color are defined;
   plural third lines from the primary color and the secondary color to black are defined; and
   the table is created according to the first line, the second lines and the third lines,
   wherein a start of dyeing coloring agent is controlled by a user independently with respect to each of the first line, the second lines and the third lines.

2. A method according to claim 1, wherein it is possible to control ink dyeing points on the first line and the third lines.

3. A method according to claim 2, wherein the control of the ink dyeing points is performed on the basis of a manual instruction by a user.

4. A method according to claim 1, wherein a start of dyeing dark coloring agent on the first line, the second lines and the third lines is controlled in an image processing method which creates a table of an image formation apparatus for performing an image formation using plural coloring agents having different density densities for the same color.

5. A method according to claim 1, wherein a coloring agent quantity contour line is calculated on the basis of the coloring agent quantity on each side of a plane defined by the plural coloring agents.

6. A method according to claim 5, wherein non-linear curve approximation processing is used in a case of forming the coloring agent quantity contour line.

7. A method according to claim 1, wherein a cube indicating a color space is divided into plural tetrahedrons, and interpolation processing is executed by connecting points having the same coloring agent quantity on three sides of each triangle indicating side planes of the divided tetrahedrons.

8. An image processing apparatus, which creates a table for separating a color into colors of respective coloring agents available in an image formation apparatus, said image processing apparatus comprising:
   means for defining a first line which is from white to black;
   means for defining plural second lines which are from white to a primary color and a secondary color;
   means for defining plural third lines which are from the primary color and the secondary color to black; and
   means for creating the table according to the first line, the second lines and the third lines wherein a start of dyeing coloring agent is controlled by a user independently with respect to each of the first line, the second lines and the third lines.

9. A storage medium which computer-readably stores therein a program for realizing an image processing method which creates a table of an image formation apparatus for performing an image formation using plural coloring agents having different density for the same color, wherein:
   a first line from black to white is defined;
   plural second lines from white to a primary color and a secondary color are defined;
   plural third lines from the primary color and the secondary color to black are defined; and
   the table is created according to the first line, the second lines and the third lines,
   wherein a start of dyeing coloring agent is controlled by a user independently with respect to each of the first line, the second lines and the third lines.

* * * * *

UNITED STATES PATENT AND TRADEMARK OFFICE
CERTIFICATE OF CORRECTION

| | |
|---|---|
| PATENT NO. | : 7,016,530 B2 |
| APPLICATION NO. | : 09/902719 |
| DATED | : March 21, 2006 |
| INVENTOR(S) | : Kazuhiro Saito et al. |

It is certified that error appears in the above-identified patent and that said Letters Patent is hereby corrected as shown below:

COLUMN 2

Line 28, "method," should read --method--.

COLUMN 3

Line 4, "consisted" should read --consisting--;
    Line 15, "identical" should read --identical to--;
    Line 59, close up right margin; and
    Line 60, close up left margin.

COLUMN 4

Line 47, "t his" should read --this--.

COLUMN 5

Line 24, "vertexes" should read --vertices--.

COLUMN 6

Line 2, "CO, MO, YO, RO, GO, and BO" should read --C0, M0, Y0, R0, G0, and B0--.

COLUMN 7

Line 44, "left upper" should read --upper left--.

COLUMN 8

Line 27, "HO-H-H1-H2" should read --H0-H-H1-H2.--; and
    Line 30, "h > I$\leq$j." should read --h> I$\geq$j.--.

COLUMN 9

Line 33, "vertexes" should read --vertices--; and "three dimensionally" should read --three-dimensionally--.

UNITED STATES PATENT AND TRADEMARK OFFICE
CERTIFICATE OF CORRECTION

PATENT NO. : 7,016,530 B2
APPLICATION NO. : 09/902719
DATED : March 21, 2006
INVENTOR(S) : Kazuhiro Saito et al.

It is certified that error appears in the above-identified patent and that said Letters Patent is hereby corrected as shown below:

COLUMN 10

Line 24, close up right margin;
      Line 25, close up left margin.

COLUMN 11

Line 16, "case" should read --a case--; and
      Line 39, "vertices 12, 13, 14 and 15" should read --vertices I2, I3, I4 and I5--.

COLUMN 12

Line 16, "easily simply" should read --easily done simply--.

COLUMN 14

Line 46, "lines wherein" should read --lines, wherein--; and
      Line 54, "density" should read --densities--.

Signed and Sealed this

Fourteenth Day of November, 2006

JON W. DUDAS
*Director of the United States Patent and Trademark Office*